US012677180B2

(12) United States Patent
Cui et al.

(10) Patent No.: US 12,677,180 B2
(45) Date of Patent: Jul. 7, 2026

(54) TECHNOLOGIES FOR IN-DEVICE COEXISTENCE IN NETWORK COMMUNICATION

(71) Applicant: APPLE INC., Cupertino, CA (US)

(72) Inventors: Jie Cui, San Jose, CA (US); Chunxuan Ye, San Diego, AL (US); Dawei Zhang, Saratoga, CA (US); Hong He, San Jose, CA (US); Huaning Niu, San Jose, CA (US); Qiming Li, Beijing (CN); Xiang Chen, Campbell, CA (US); Yang Tang, San Jose, CA (US)

(73) Assignee: APPLE INC., Cupertino, CA (US)

( * ) Notice: Subject to any disclaimer, the term of this patent is extended or adjusted under 35 U.S.C. 154(b) by 913 days.

(21) Appl. No.: 17/442,946

(22) PCT Filed: May 4, 2021

(86) PCT No.: PCT/CN2021/091808
§ 371 (c)(1),
(2) Date: Sep. 24, 2021

(87) PCT Pub. No.: WO2022/232963
PCT Pub. Date: Nov. 10, 2022

(65) Prior Publication Data
US 2023/0239719 A1    Jul. 27, 2023

(51) Int. Cl.
*H04W 28/02*      (2009.01)
*H04W 48/16*      (2009.01)
*H04W 72/12*      (2023.01)

(52) U.S. Cl.
CPC ....... *H04W 28/0215* (2013.01); *H04W 48/16* (2013.01); *H04W 72/1215* (2013.01)

(58) Field of Classification Search
CPC ............. H04W 28/0215; H04W 48/16; H04W 72/1215; H04W 88/06
See application file for complete search history.

(56) References Cited

U.S. PATENT DOCUMENTS

| | | | | |
|---|---|---|---|---|
| 12,323,842 | B2 * | 6/2025 | Manolakos | ........... H04L 5/0053 |
| 2013/0303199 | A1 * | 11/2013 | Siomina | ................ H04W 24/10 |
| | | | | 455/456.5 |
| 2015/0296526 | A1 | 10/2015 | Behravan et al. | |
| 2019/0230619 | A1 * | 7/2019 | Cui | ........................ H04W 64/00 |
| 2022/0417889 | A1 * | 12/2022 | Liberg | ................. H04B 7/1851 |

(Continued)

FOREIGN PATENT DOCUMENTS

| | | |
|---|---|---|
| CN | 107071879 A | 8/2017 |
| CN | 110651512 A | 1/2020 |

(Continued)

OTHER PUBLICATIONS

Article entitled, "On GNSS Measurement for NTN", Apple, 3GPP TSG-RAN4 Meeting #98bis-e, R4-2104834, dated Apr. 20, 2021 in 3 pages.

(Continued)

*Primary Examiner* — Brian S Roberts
(74) *Attorney, Agent, or Firm* — Kilpatrick Townsend & Stockton LLP

(57) ABSTRACT

The present application relates to devices and components including apparatus, systems, and methods for non-terrestrial network communication in wireless communication systems.

20 Claims, 22 Drawing Sheets

(56) References Cited

U.S. PATENT DOCUMENTS

| | | | | |
|---|---|---|---|---|
| 2024/0057002 A1* | 2/2024 | Sun | .................. | H04W 56/0045 |
| 2024/0064735 A1* | 2/2024 | Atungsiri | .......... | H04B 7/18513 |

FOREIGN PATENT DOCUMENTS

| | | |
|---|---|---|
| CN | 110859009 A | 3/2020 |
| WO | 2020117301 | 6/2020 |
| WO | 2020231831 | 11/2020 |
| WO | 2021059089 A1 | 4/2021 |
| WO | 2022199257 A1 | 9/2022 |

OTHER PUBLICATIONS

Article entitled, "On UL Time and Frequency Synchronization Enhancements for NTN", Ericsson, 3GPP TSG-RAN WG1 Meeting #102-e, R1-2005502, dated Aug. 28, 2020 in 13 pages.

International Search Report and Written Opinion issued in PCT Application No. PCT/CN2021/091808, dated Jan. 28, 2022 in 13 pages.

Invitation to Pay Additional Fees and, Where Applicable, Protest Fee issued in PCT Application No. PCT/CN2021/091808, dated Nov. 24, 2021 in 2 pages.

3rd Generation Partnership Project; Technical Specification Group Radio Access Network; NR; User Equipment (UE) radio transmission and reception; Part 1: Range 1 Standalone (Release 17); 3GPP TS 38.101-1 V17.1.0 (Mar. 2021 in 512 pages.

3rd Generation Partnership Project; Technical Specification Group Radio Access Network; Study on New Radio (NR) to support non-terrestrial networks (Release 15); 3GPP TR 38.811 V15.4.0 (Sep. 2020) in 127 pages.

3rd Generation Partnership Project; Technical Specification Group Radio Access Network; Solutions for NR to support non-terrestrial networks (NTN) (Release 16); 3GPP TR 38.821 V16.0.0 (Dec. 2019) in 140 pages.

Federica Rinaldi, et al., Article entitled "Non-Terrestrial Networks in 5G & Beyond: A Survey," IEEE Access, Multidisciplinary, Rapid Review, Open Access Journal; , accepted Aug. 19, 2020, date of publication Sep. 10, 2020, date of current version Sep. 22, 2020; Digital Object Identifier 10.1109/ACCESS.2020.3022981 in 23 pages.

Thales (moderator); Agenda Item 8.4.2; entitled: Feature lead Summary on enhancements on UL time and frequency synchronization for NR NTN; 3GPP TSG-RAN WG1 Meeting #102-e R1-20xxxxx; e-Meeting, Aug. 17-28, 2020 in 44 pages.

Status Report to TSG, Agenda item: 9.8.6—Solutions for NR to support NTN [RAN2 WI: NR_NTN_solutions]; 3GPP TSG RAN meeting #90-e RP-202257; Electronic Meeting, Dec. 7-11, 2020 in 17 pages.

Weijin Wang, et al., entitled: "Location-Based Timing Advance Estimation for 5G Integrated LEO Satellite Communications," National Mobile Communications Research Laboratory, Southeast University, Nanjing 210096, China; arXiv:2105.03858v1 [cs.IT] May 9, 2021 in 16 pages.

3rd Generation Partnership Project; Technical Specification Group Radio Access Networks; Evolved Universal Terrestrial Radio Access (E-UTRA); Study on signalling and procedure for interference avoidance for in-device coexistence; (Release 10); 3GPP TR 36.816 v1.3.1 (May 2011) in 40 pages.

Technical Specification; 5G; NR; Requirements for support of radio resource management (3GPP TS 38.133 version 16.6.0 Release 16); ETSI TS 138 133 V16.6.0 (Feb. 2021) in 1847 pages.

3rd Generation Partnership Project; Technical Specification Group Radio Access Network; NR; Radio Resource Control (RRC) protocol specification (Release 16); 3GPP TS 38.331 V16.4.1 (Mar. 2021) in 949 pages.

China Patent Application No. 202180006361.5, Office Action, Jun. 25, 2025, 28 pages.

Measurement Requirements In Ntn Systems, 3rd Generation Partnership Project Technical Specification Group-Radio Access Network Working Group 4, Meeting # 98-bis-e Electronic Meeting R4-2107292, Apr. 12-20, 2021, 6 pages.

European Patent Application No. 21939612.4, Extended European Search Report, Mailed on Dec. 3, 2024, 12 pages.

Office Action issued in China Application No. CN202180006361.5, dated Oct. 29, 2025 in 14 pages.

Office Action issued in China Application No. CN202180006361.5, dated Feb. 11, 2026 in 12 pages.

* cited by examiner

| NR operating band | Uplink operating band (BS receive / UE transmit) | NR operating band | Uplink operating band (BS receive / UE transmit) |
|---|---|---|---|
| n1 | 1920 MHz – 1980 MHz | n65 | 1920 MHz – 2010 MHz |
| n2 | 1850 MHz – 1910 MHz | n66 | 1710 MHz – 1780 MHz |
| n3 | 1710 MHz – 1785 MHz | n70 | 1695 MHz – 1710 MHz |
| n5 | 824 MHz – 849 MHz | n71 | 663 MHz – 698 MHz |
| n7 | 2500 MHz – 2570 MHz | n74 | 1427 MHz – 1470 MHz |
| n8 | 880 MHz – 915 MHz | n77 | 3300 MHz – 4200 MHz |
| n12 | 699 MHz – 716 MHz | n78 | 3300 MHz – 3800 MHz |
| n13 | 777 MHz – 787 MHz | n79 | 4400 MHz – 5000 MHz |
| n14 | 788 MHz – 798 MHz | n80 | 1710 MHz – 1785 MHz |
| n18 | 815 MHz – 830 MHz | n81 | 880 MHz – 915 MHz |
| n20 | 832 MHz – 862 MHz | n82 | 832 MHz – 862 MHz |
| n24 | 1626.5 MHz – 1660.5 MHz | n83 | 703 MHz – 748 MHz |
| n25 | 1850 MHz – 1915 MHz | n84 | 1920 MHz – 1980 MHz |
| n26 | 814 MHz – 849 MHz | n86 | 1710 MHz – 1780 MHz |
| n28 | 703 MHz – 748 MHz | n89 | 824 MHz – 849 MHz |
| n30 | 2305 MHz – 2315 MHz | n90 | 2496 MHz – 2690 MHz |
| n34 | 2010 MHz – 2025 MHz | n91 | 832 MHz – 862 MHz |
| n38 | 2570 MHz – 2620 MHz | n92 | 832 MHz – 862 MHz |
| n39 | 1880 MHz – 1920 MHz | n93 | 880 MHz – 915 MHz |
| n40 | 2300 MHz – 2400 MHz | n94 | 880 MHz – 915 MHz |
| n41 | 2496 MHz – 2690 MHz | n95 | 2010 MHz – 2025 MHz |
| n46 | 5150 MHz – 5925 MHz | n96 | 5925 MHz – 7125 MHz |
| n47 | 5855 MHz – 5925 MHz | n97 | 2300 MHz – 2400 MHz |
| n48 | 3550 MHz – 3700 MHz | n98 | 1880 MHz – 1920 MHz |
| n50 | 1432 MHz – 1517 MHz | n99 | 1626.5 MHz – 1660.5 MHz |
| n51 | 1427 MHz – 1432 MHz | | |
| n53 | 2483.5 MHz – 2495 MHz | | |

FIG. 4

| Frequencies identified by ITU Radio Regulation for use by MSS (uplink) | |
| --- | --- |
| GEO-based | 1626.5-1660.5 MHz and 1668-1675 MHz |
| non-GEO-based | 1610.0-1626.5 MHz |

FIG. 5

GNSS upper L-band

FIG. 7 determining a capability of a UE to support a connection to an NTN serving cell while transmitting on a GNSS-interfering band
904 in response to a result of the determining, excluding the UE from connecting to an NTN serving cell on the GNSS-interfering band
908

900 initiating a process to configure a UE for connection to an NTN serving cell
1004 obtaining an indication that the UE has a serving connection on a GNSS-interfering band
1008 in response to the indication, terminating the process to configure the UE for connection to the NTN serving cell
1012

1000

1100 determining a plurality of bands that are available for cell detection or random access in an NTN system
1104 performing, on at least one of the determined plurality of bands, cell detection or random access in the NTN system
1108 receiving a command to activate an NTN serving cell provided by an NTN access node
1204 obtaining an indication that the UE has a serving connection on a GNSS-interfering band
1208 in response to the indication, quitting an activation procedure for the NTN serving cell or dropping the serving connection on the GNSS-interfering band
1212

1200 transmitting an indication of a capability of the UE to support a connection to an NTN serving cell while transmitting on a GNSS-interfering band
1304 receiving a command to activate a serving cell
1308

1300

1400 obtaining, according to a first periodicity, GNSS measurements for timing advance calculation
1404 transmitting an indication of the first periodicity
1408 receiving an uplink gap pattern
1504 in accordance with the received uplink gap pattern, obtaining GNSS measurements for timing advance calculation
1508

1500 obtaining, over a first time period, GNSS measurements for timing advance calculation
1604 muting, or otherwise reducing a transmit power of, an uplink transmission on a GNSS-interfering band that is scheduled to occur during the first period
1608

1600 transmitting, to a UE, a schedule for uplink transmissions on a GNSS-interfering band
1704 transmitting, to the UE, an indication of whether to prioritize GNSS measurements for timing advance calculation over the uplink transmissions
1708

1700 during each of a plurality of first time periods, performing uplink transmission on a GNSS-interfering band
1804 during each of a plurality of second time periods, obtaining GNSS measurements for timing advance calculation from a GNSS band that is not within the range of from 1559 to 1610 megahertz
1808

1800

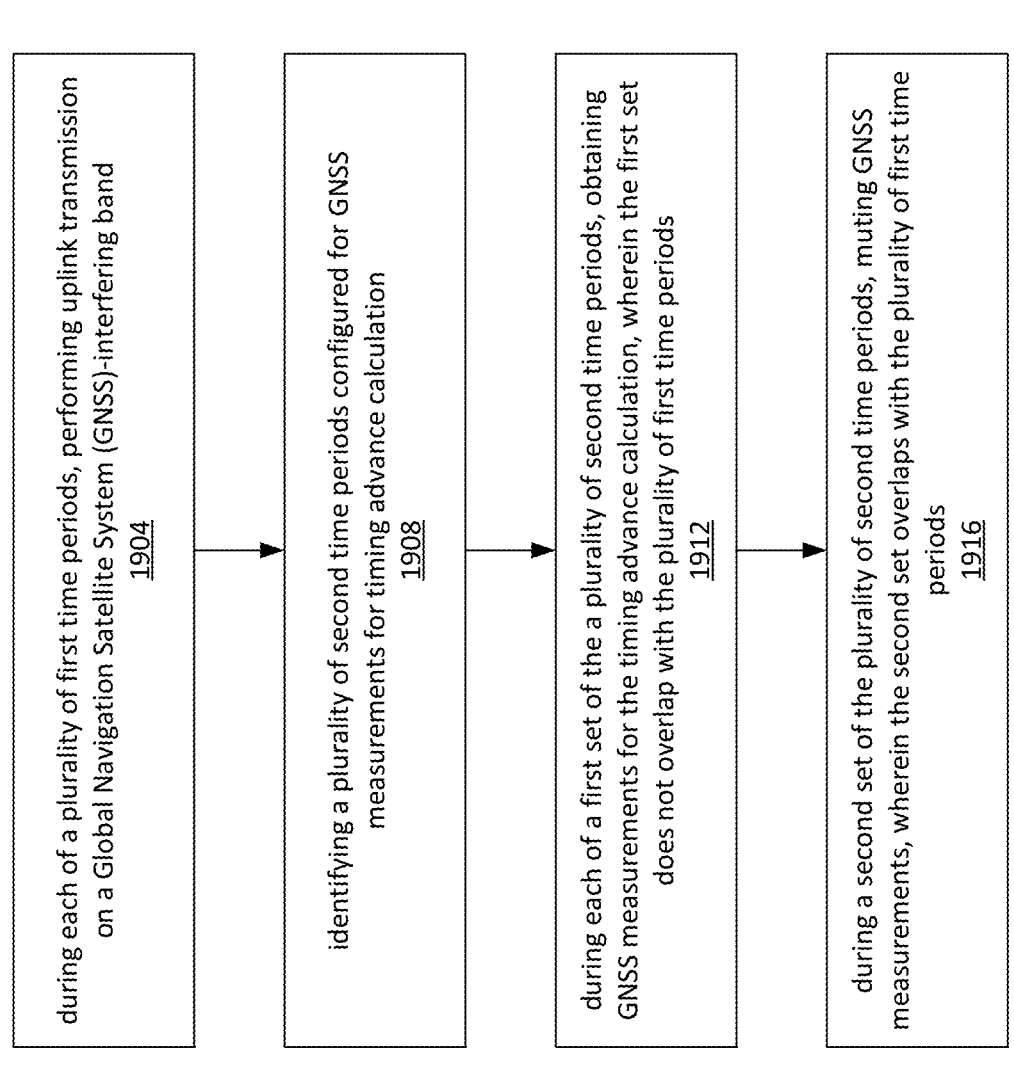

FIG. 19

1900 during each of a plurality of first time periods, performing uplink transmission on a Global Navigation Satellite System (GNSS)-interfering band
1904 identifying a plurality of second time periods configured for GNSS measurements for timing advance calculation
1908 during each of a first set of the a plurality of second time periods, obtaining GNSS measurements for the timing advance calculation, wherein the first set does not overlap with the plurality of first time periods
1912 during a second set of the plurality of second time periods, muting GNSS measurements, wherein the second set overlaps with the plurality of first time periods
1916

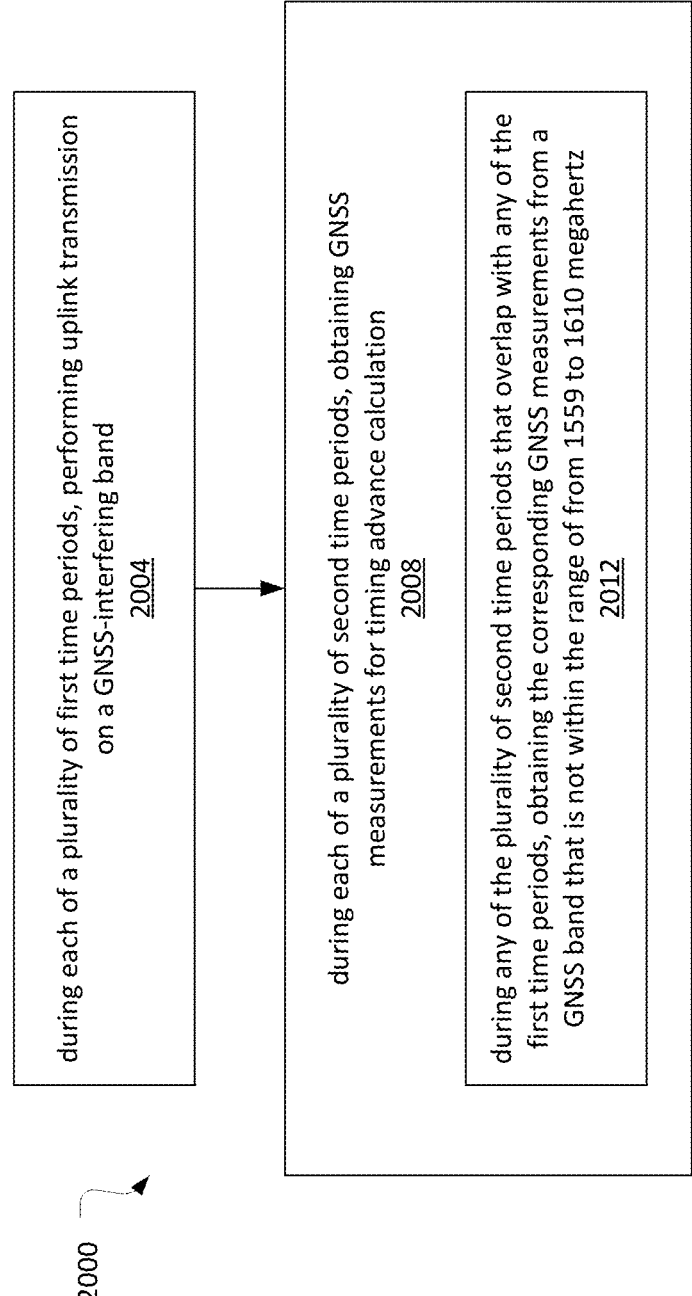

during each of a plurality of first time periods, performing uplink transmission on a GNSS-interfering band
2004 during each of a plurality of second time periods, obtaining GNSS measurements for timing advance calculation
2008 during any of the plurality of second time periods that overlap with any of the first time periods, obtaining the corresponding GNSS measurements from a GNSS band that is not within the range of from 1559 to 1610 megahertz
2012

TECHNOLOGIES FOR IN-DEVICE COEXISTENCE IN NETWORK COMMUNICATION

This application is a 35 U.S.C. § 371 National Stage Entry of International Application No. PCT/CN2021/091808, filed on May 4, 2021, which is incorporated herein by reference in its entirety for all purposes.

BACKGROUND

Third Generation Partnership Project (3GPP) Fifth Generation (5G) New Radio (NR) networks rely on a large number of geographically distributed base stations to provide cellular coverage over expansive areas. A user equipment (UE) may travel between areas covered by different base stations. A source base station may handover communications to a target base station as the UE moves between cells to provide continuous, uninterrupted service to the UE. 3GPP working groups are investigating techniques for mobile base stations to enable operation of New Radio (NR) protocols in various access networks, including non-terrestrial access networks.

BRIEF DESCRIPTION OF THE DRAWINGS

FIG. 4 shows possible NR Frequency Range 1 (FR1) bands.

FIG. 5 shows the L-band spectrum allocation for uplink transmissions for mobile satellite services (MSS).

FIG. 7 shows a band allocation for the GNSS upper L-band.

FIG. 19 illustrates an operational flow/algorithmic structure in accordance with some embodiments.

FIG. 20 illustrates an operational flow/algorithmic structure in accordance with some embodiments.

DETAILED DESCRIPTION

Figure 1:
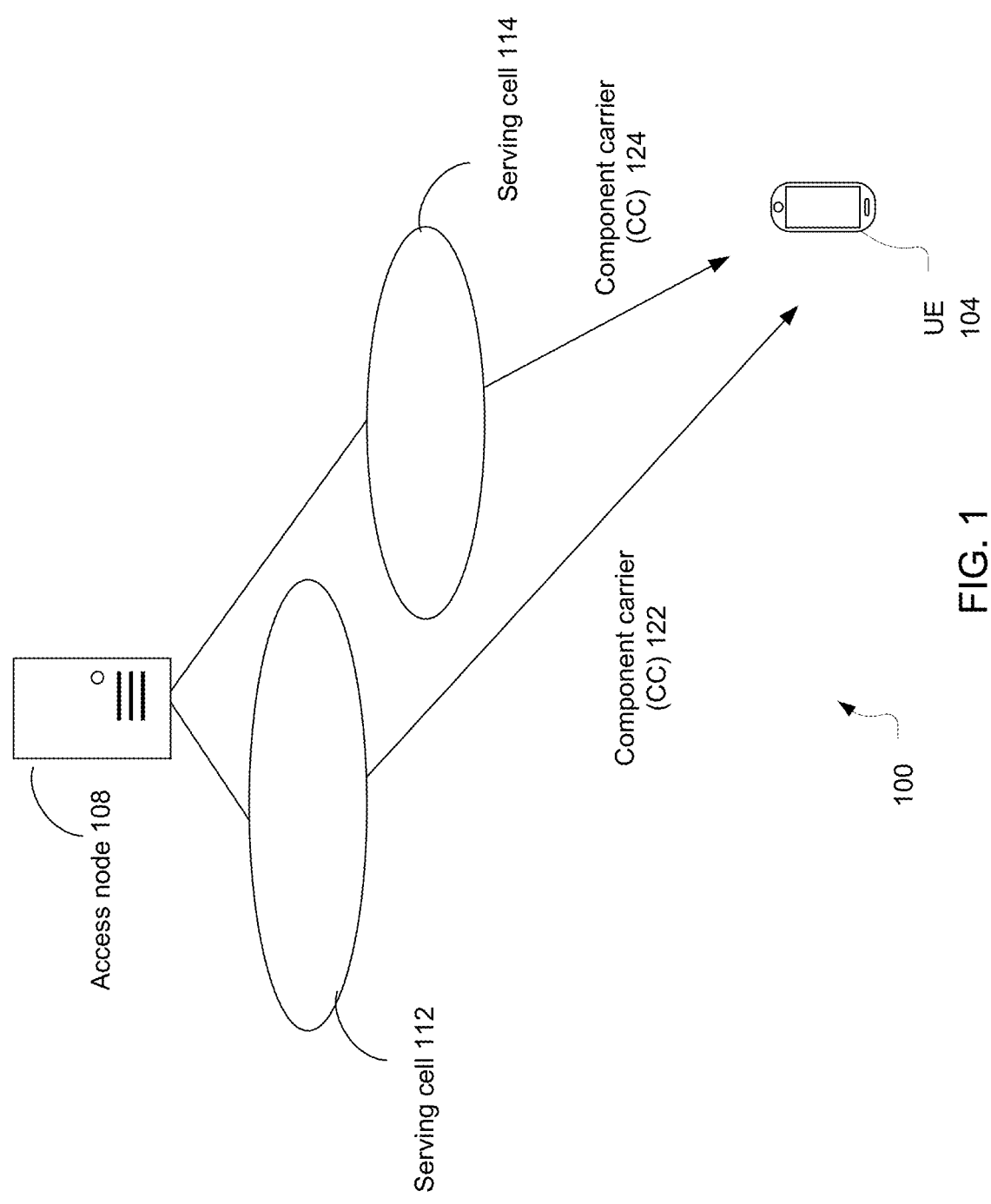
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B).

The following is a glossary of terms that may be used in this disclosure.

The term "circuitry" as used herein refers to, is part of, or includes hardware components such as an electronic circuit, a logic circuit, a processor (shared, dedicated, or group) or memory (shared, dedicated, or group), an application specific integrated circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable system-on-a-chip (SoC)), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, or transferring digital data. The term "processor circuitry" may refer an application processor, baseband processor, a central processing unit (CPU), a graphics processing unit, a single-core processor, a dual-core processor, a triple-core processor, a quad-core processor, or any other device capable of executing or otherwise operating computer-executable instructions, such as program code, software modules, or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" or "system" may refer to various components of a computer that are communicatively coupled with one another. Furthermore, the term "computer system" or "system" may refer to multiple computer devices or multiple computing systems that are communicatively coupled with one another and configured to share computing or networking resources.

The term "resource" as used herein refers to a physical or virtual device, a physical or virtual component within a computing environment, or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, or the like. A "hardware resource" may refer to compute, storage, or network resources provided by physical hardware element(s). A "virtualized resource" may refer to compute, storage, or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with or equivalent to "communications channel," "data communications channel," "transmission channel," "data transmission channel," "access channel," "data access channel," "link," "data link," "carrier," "radio-frequency carrier," or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment or infrastructure used to provide wired or wireless communication network services. The term "network element" may be considered synonymous to or referred to as a networked computer, networking hardware, network equipment, network node, virtualized network function, or the like.

The term "information element" refers to a structural element containing one or more fields. The term "field" refers to individual contents of an information element, or a data element that contains content. An information element may include one or more additional information elements.

Techniques for addressing potential in-device coexistence (IDC) issues are described herein, especially with respect to non-terrestrial network (NTN) communication. FIG. 1 illustrates a network environment 100 in accordance with some embodiments. The network environment 100 may include a user equipment (UE) 104 and an access node (or "base station" or "gNB") 108. The access node 108 may provide one or more wireless serving cells 112 and 114, for example, 3GPP New Radio "NR" cells, through which the UE 104 may communicate with the access node 108 (e.g., over an NR-Uu interface).

The access node 108 may transmit information (for example, data and control signaling) in the downlink direction by mapping logical channels on the transport channels, and transport channels onto physical channels. The logical channels may transfer data between a radio link control (RLC) and media access control (MAC) layers; the transport channels may transfer data between the MAC and PHY layers; and the physical channels may transfer information across the air interface. The physical channels may include a physical broadcast channel (PBCH); a physical downlink shared channel (PDSCH); and a physical downlink control channel (PDCCH).

The PBCH may be used to broadcast system information that the UE 104 may use for initial access to a serving cell. The PBCH may be transmitted along with physical synchronization signals (PSS) and secondary synchronization signals (SSS) in a synchronization signal (SS)/PBCH block. The SS/PBCH blocks (SSBs) may be used by the UE 104 during a cell search procedure and for beam selection.

The PDSCH may be used to transfer end-user application data, signaling radio bearer (SRB) messages, system information messages (other than, for example, a Master Information Block (MIB)), and paging messages.

The access node (e.g., base station or gNB) 108 may also transmit various reference signals to the UE 104. A Reference Signal (RS) is a special signal that exists only at PHY layer and is not for delivering any specific information (e.g., data), but whose purpose instead is to deliver a reference point for transmitted power. The reference signals may include demodulation reference signals (DMRSs) for the PBCH, PDCCH, and PDSCH. The UE 104 may compare a received version of the DMRS with a known DMRS sequence that was transmitted to estimate an impact of the propagation channel. The UE 104 may then apply an inverse of the propagation channel during a demodulation process of a corresponding physical channel transmission.

The reference signals may also include channel state information-reference signals (CSI-RS). The CSI-RS may be a multi-purpose downlink transmission that may be used for CSI reporting, beam management, connected mode mobility, radio link failure detection, beam failure detection and recovery, and fine tuning of time and frequency synchronization. For example, the SSBs and CSI-RSs may be measured by the UE 104 to determine the desired downlink beam pair for transmitting/receiving PDCCH and physical downlink shared channel (PDSCH) transmissions. The UE may use a Physical Uplink Control Channel (PUCCH) to transmit uplink control information (UCI) to the access node 108, including, for example, hybrid-automatic repeat request (HARQ) acknowledgements, scheduling requests, and periodic and semi-persistent channel state information (CSI) reports.

The UE 104 may include enhanced Multiple-Input-Multiple-Output (eMIMO) capabilities that support simultaneous communication over beams from several (or even many) different serving cells. FIG. 1 shows an example of carrier aggregation (CA), in which the UE 104 receives data from access node 108 simultaneously from serving cell 112 over a component carrier (CC) 122 and from serving cell 114 over a component carrier (CC) 124. One of the serving cells 112 and 114 may be a primary serving cell (PCell), and the other may be a secondary serving cell (SCell).

The CC 122 may be in a band in Frequency Range 1 (FR1) or in Frequency Range 2 (FR2). Likewise the CC 124 may be in a band in FR1 or in FR2. The CCs 112 and 124 may be in the same band (intra-band, either contiguous or non-contiguous) or may be in different bands (inter-band) and possibly different frequency ranges. For FR1 (e.g., below 7.225 GHz), a transmit antenna of the UE 104 is typically implemented as an omnidirectional antenna. For FR2 (e.g., 24.250 GHz and above, also called mmWave), a transmit antenna of the UE 104 may be implemented as a panel having multiple antenna elements. For example, the multiple antenna elements of a panel may be driven as a phased array (e.g., to direct a beam in a desired direction).

Figure 2:
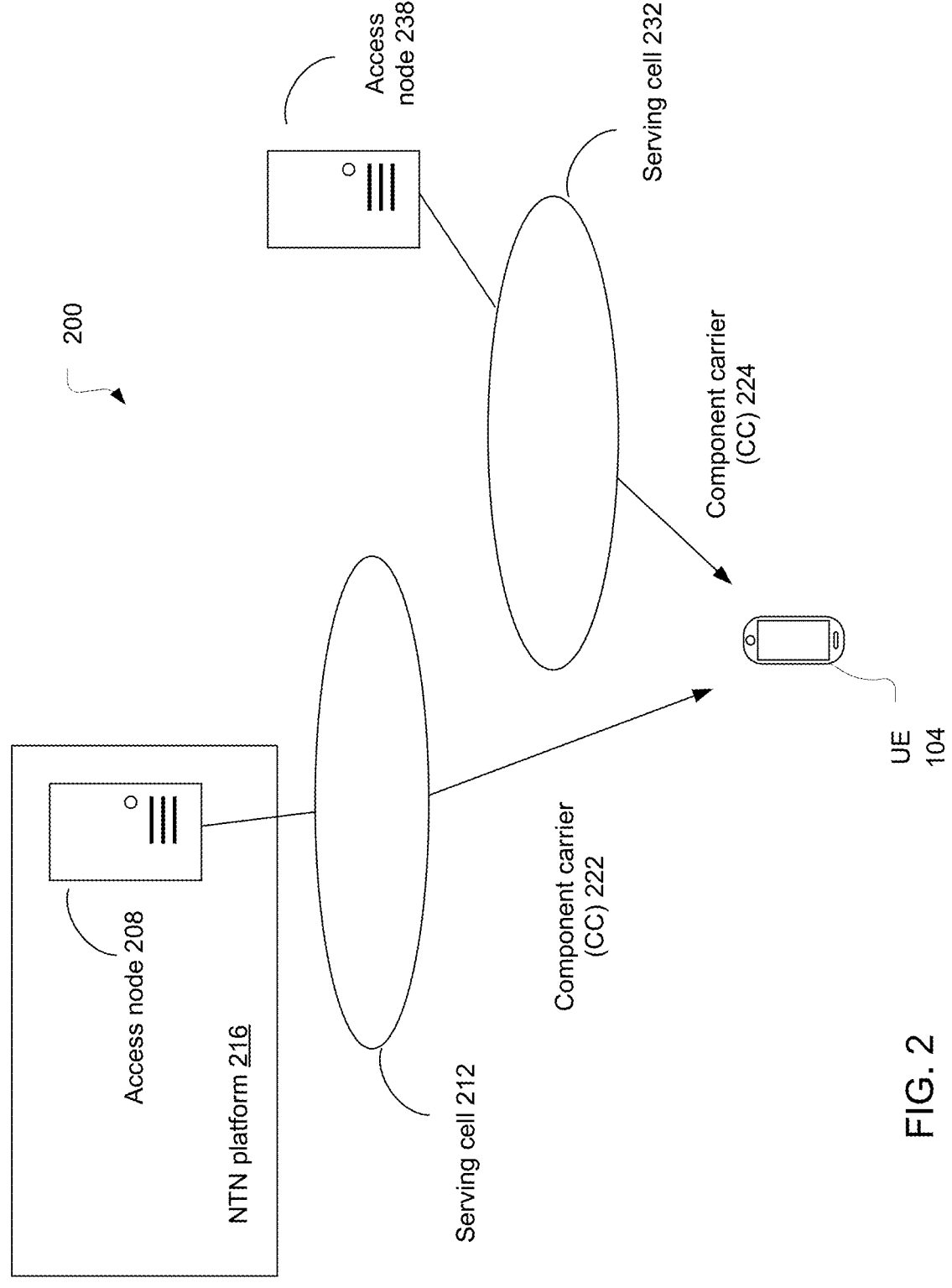
FIG. 2 illustrates a network environment in accordance with some embodiments.

FIG. 2 illustrates a network environment 200 in accordance with some embodiments. The network environment 200 may include the UE 104 and two or more access nodes (or "base stations") 208 and 238. Each of the access nodes 208 and 238 may provide one or more wireless serving cells, for example, 3GPP New Radio "NR" cells, through which the UE 104 may communicate with the access nodes 208 and 238. In this example, access node 208 provides a serving cell 212 that communicates with the UE 104 over CC 222, and access node 238 provides a serving cell 232 that communicates with the UE 104 over CC 224. One of the serving cells 212 and 232 may be a primary serving cell (PCell), and the other may be a secondary serving cell (SCell).

The UE 104 may communicate with the access nodes 208 and 238 over an air interface compatible with 3GPP technical specifications such as those that define Fifth Generation (5G) NR system standards. Each of the access nodes 208 and 238 may be a next-generation—radio access network (NG-RAN) node that is coupled with a 5G core network. An NG-RAN node may be either a gNB to provide an NR user plane and control plane protocol terminations toward the UE 104 or an ng-eNB to provide evolved universal terrestrial radio access (E-UTRA) user plane and control plane protocol terminations toward the UE 104.

In a 5G NR network, it may be important for uplink transmissions by the various UEs to be synchronized when received by an access node. To achieve such synchronization at the access node in a legacy NR network, a UE may be configured to adjust the timing of its uplink transmissions by a negative offset called a Timing Advance (TA). A UE that is farther away from the access node may be configured to apply a larger Timing Advance than a UE that is closer to the access node, for example, in order to compensate for the larger propagation delay. In a legacy NR network, a UE may apply a Timing Advance (TA) that is based on two values: a TA_offset value that is indicated in the specification (3GPP TS 38.133), and a TA command that is provided by the network to the UE in a Medium Access Control (MAC) Control Element (MAC-CE) command and indicates a value that is combined with the TA_offset.

In the example of FIG. 2, the access node 208 is part of a non-terrestrial network (NTN) and is on a NTN platform 216. The NTN platform 216 may be a spaceborne platform, such as a satellite for mobile satellite services, which may be in a geostationary earth orbit (GEO) or a non-geostationary earth orbit (e.g., a low earth orbit or LEO). Alternatively, the NTN platform 216 may be another non-terrestrial vehicle, such as an airborne platform (e.g., a drone, balloon, or winged aircraft).

Using NTNs to support 5G mobile communications may be challenging because of, for example, the propagation delays associated with the very long distances between the UEs and the access nodes. Such distances are more than 150 kilometers (km) for an NTN vehicle in LEO and over 35,000 km for an NTN in GEO. With reference to NTNs, it may be desired to impose conditions such as the following: 1) an NTN UE in RRC_IDLE and RRC_INACTIVE states may be required to at least support UE-specific Timing Advance (TA) calculation based at least on its GNSS-acquired position and the serving satellite ephemeris; 2) an NR NTN UE in RRC_IDLE and RRC_INACTIVE states may be required to be capable of at least using its acquired GNSS position and satellite ephemeris (which may be provided by the network) to calculate frequency pre-compensation to counter-shift the Doppler experienced on the service link; 3) an NR NTN UE in RRC_CONNECTED state may be required to be capable of at least using its acquired GNSS position and satellite ephemeris to perform frequency pre-compensation to counter-shift the Doppler experienced on the service link.

In order to acquire its GNSS position, a UE obtains GNSS measurements (i.e., measurements of received GNSS signals, such as code phase and/or carrier phase) and performs calculations based on those measurements to derive the position information. Based on its acquired GNSS position, the UE may then calculate the distance between the UE and the NTN vehicle, determine a corresponding TA, and apply the determined TA onto its uplink (UL) transmission to the NTN network.

In NTN Radio Resource Management (RRM), the GNSS measurement may be desired for the NTN connection, since for instance the UE-specific TA is derived based on self-estimation with GNSS capability, and calculation of frequency pre-compensation on the service link is also based on UE GNSS positioning. Furthermore, in some instances it may be mandatory for an NTN UE to support GNSS measurement for IDLE/INACTIVE/CONNECTED states, such that the GNSS measurement may be a mandatory UE behavior when the UE is operating in an NTN system.

However, the GNSS measurements may be impacted by the NTN uplink transmission. Compared with GNSS measurement for positioning server-based requests in a legacy NR system, GNSS measurement for timing advance (TA) calculation is more essential in this NTN scenario, since the UE needs to determine a TA before it can transmit to the NTN gNB, whether in its initial access stage or in the connection stage. Therefore, it may be desired to prioritize GNSS measurement for TA calculation.

Figure 3:
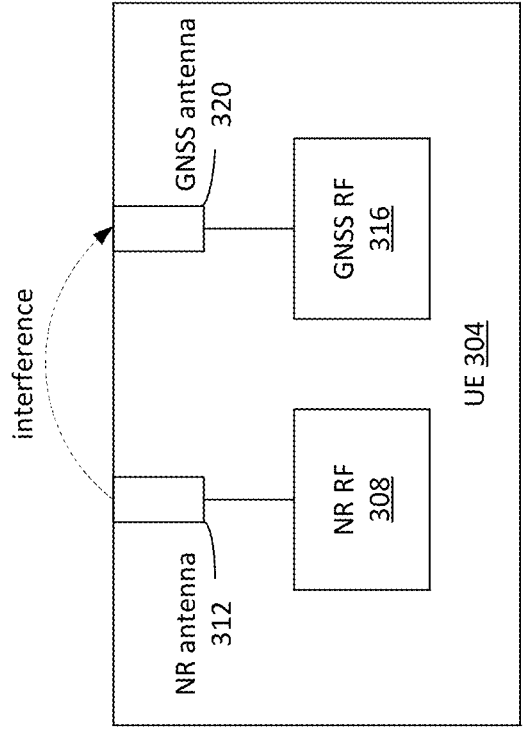
FIG. 3 shows that a NR UL transmission by a device may interfere with obtaining a Global Navigation Satellite System (GNSS) measurement by the same device.

A problem may arise in that certain transmissions by the UE may interfere with its ability to obtain GNSS measurements. FIG. 3 shows an example of a UE 304 (e.g., UE 104)

that includes an NR RF subsystem (e.g., chipset) that transmits uplink RF signals via an NR antenna 312, and a GNSS RF subsystem (e.g., chipset) that receives GNSS RF signals via a GNSS antenna 320. UE 304 may also include, for example, another RF subsystem and antenna (e.g., for Bluetooth and/or WiFi). Such in-device coexistence (IDC) may lead to in-device interference. As shown in FIG. 3, for example, the UL NR transmission at NR antenna 312 may interfere with the GNSS reception at antenna 320 in the same device, impairing the ability of the UE to acquire its GNSS position and determine a corresponding TA.

Some NR UL bands may cause in-device interference to GNSS measurement. For example, the uplink band of FR1 band n14 (788-798 MHz) is the same as the uplink band of LTE band 14. Section 4.1 of 3GPP Technical Specification (TS) 36.816 v1.3.1 (2011-05) indicates that transmissions on this band may interfere with GNSS reception because of the closeness of the band's second harmonic (1576-1596 MHz) to the L1/E1 frequency of GNSS (1575.42 MHz).

FIG. 4 shows a table of the uplink operating bands of possible NR FR1 bands (as specified in section 5.2 of 3GPP TS 38.101-1 V16.6.0 (2021-01)), which may also be used for an NTN connection. As indicated in FIG. 4, the uplink operating band of FR1 band n14 includes frequencies whose second harmonics may cause interference to GNSS measurement for NTN communication.

In addition to or in the alternative to NR FR1 bands as shown in FIG. 4, bands that are dedicated to mobile satellite services (MSS) may be used for NTN connections. FIG. 5 shows portions of the L-band (defined as 1-2 GHz) which are allocated by International Telecommunication Union (ITU) Radio Regulations to uplink transmissions for MSS. For GEO-based mobile satellite services (MSS), the 1518-1559-MHz band is allocated to downlink (space to earth) and the 1626.5-1660.5-MHz and 1668-1675-MHz bands are allocated to uplink (earth to space). For non-GEO-based (e.g., LEO) mobile satellite services (MSS), the 1613.8-1626.5-MHz band is allocated to downlink (space to earth) and the 1610.0-1626.5-MHz band is allocated to uplink (earth to space). Transmission on such uplink bands by a UE may cause direct-emission (fundamental) in-device interference to GNSS reception by the same device.

Figure 6:
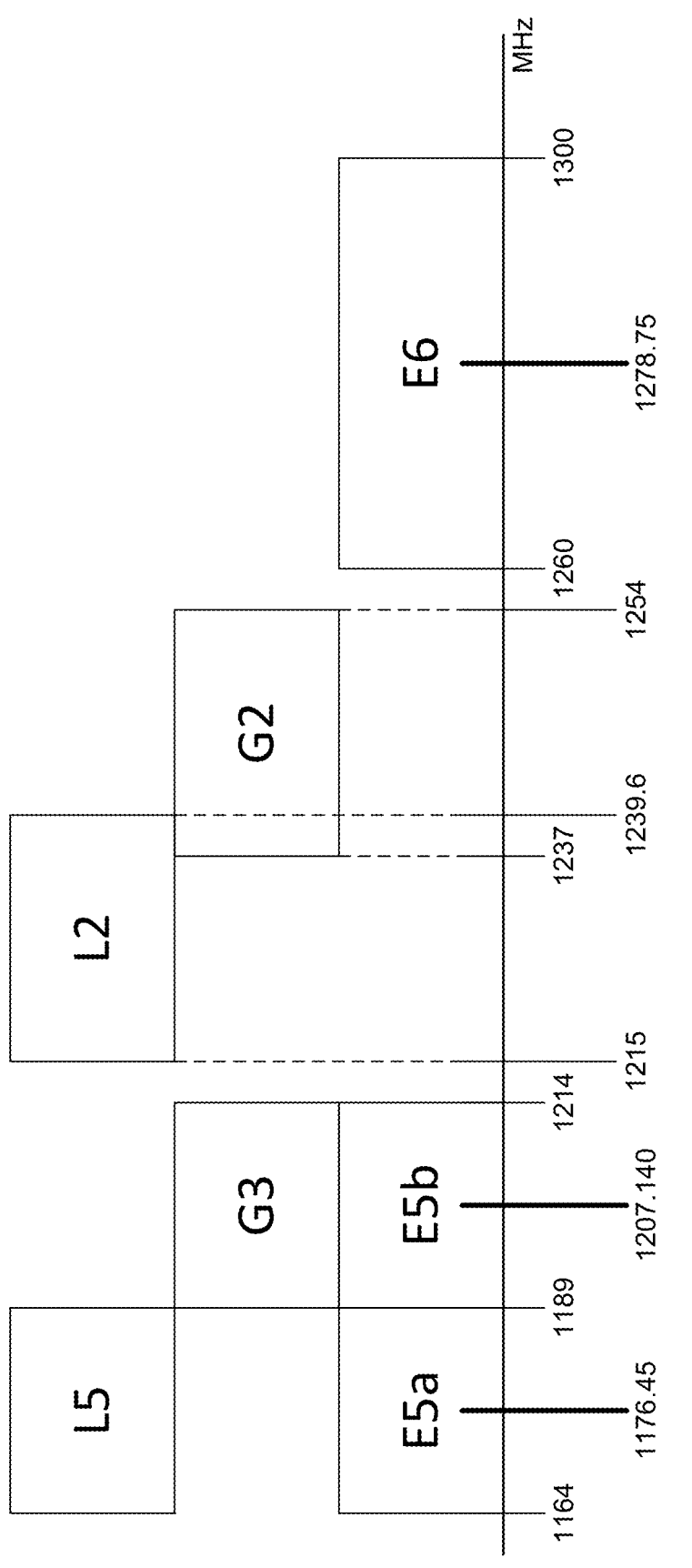
FIG. 6 shows a band allocation for the GNSS lower L-band.
Figure 7:
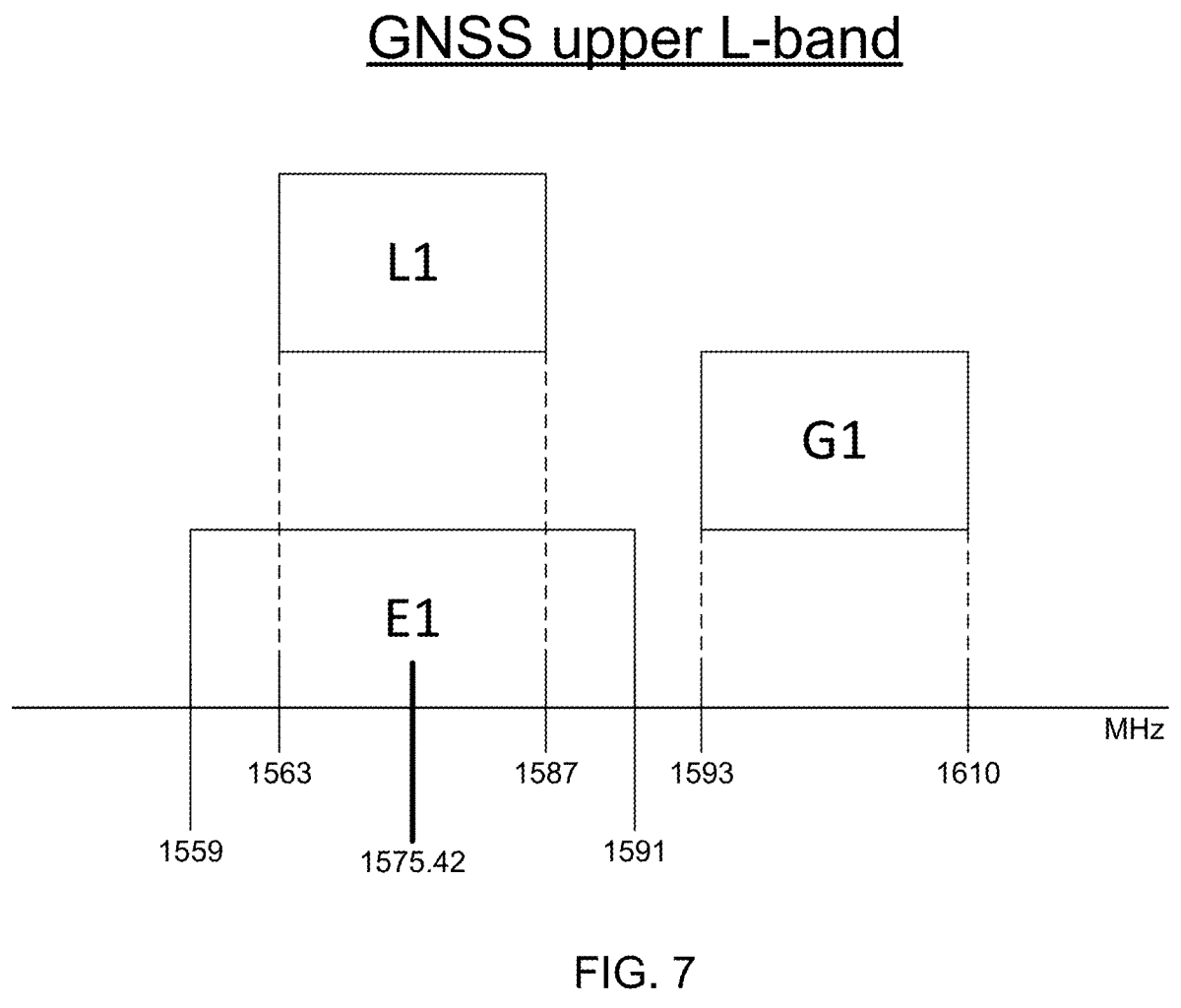

FIGS. 6 and 7 show the GNSS band allocations in the lower L-Band and the upper L-Band, respectively. In FIGS. 6 and 7: the L1, L2, and L5 bands are Global Positioning System (GPS) bands; the G1, G2, and G3 bands are GLO-NASS bands (Russia); and the E1, E5a, E5b, and E6 bands are GALILEO bands (Europe).

Figure 8:
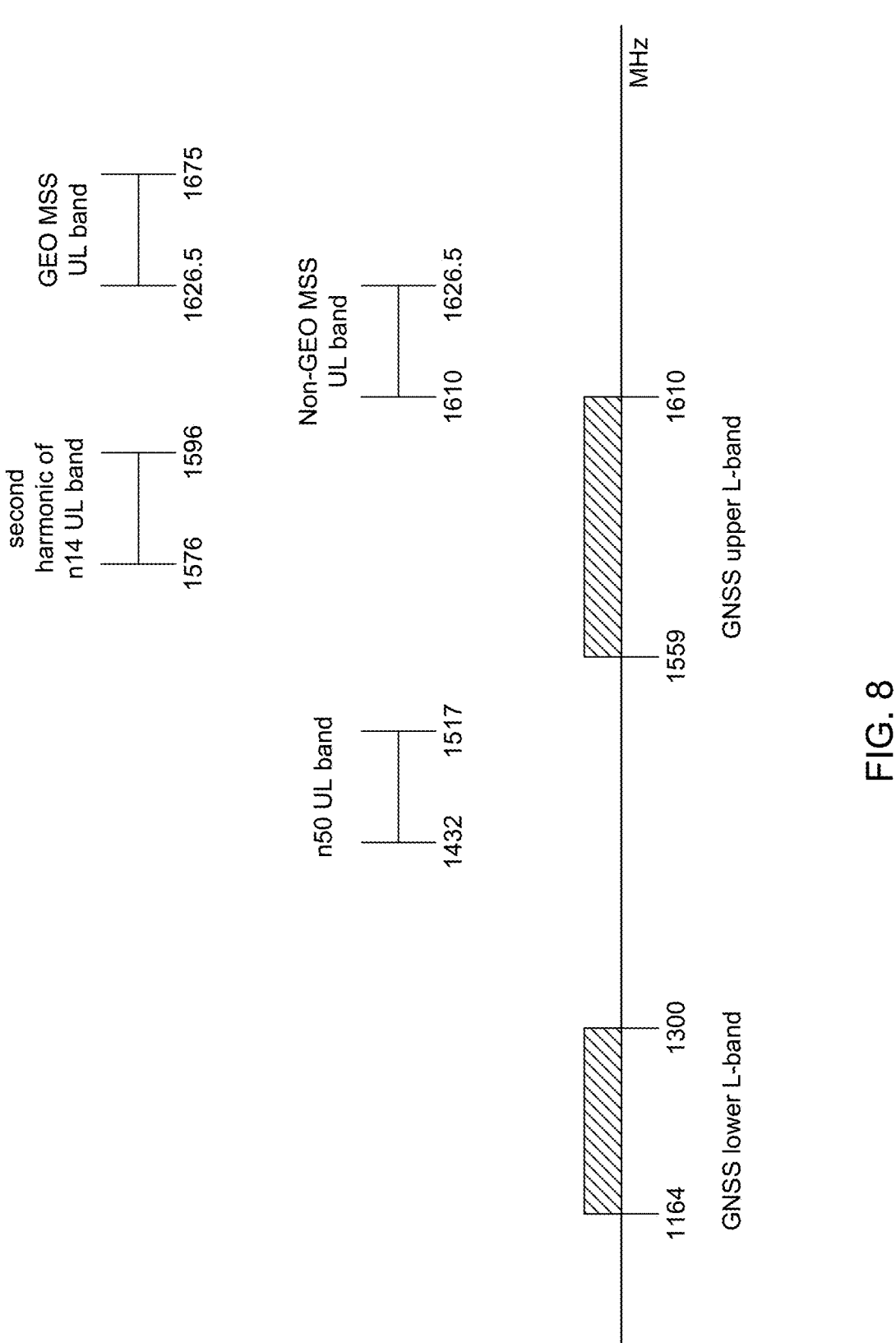
FIG. 8 shows a diagram of uplink bands, including bands that may potentially interfere with reception of GNSS L-band signals.

FIG. 8 shows a diagram of uplink bands that may potentially interfere with reception of GNSS L-band signals. It may be seen, for example, that the second harmonics of the n14 UL band frequencies (1576-1596 MHz) fall within the GNSS upper L-band range of 1559-1610 MHz. It may also be seen that the portions of the L-band that are allocated for MSS (e.g., NTN) uplink are very close to the GNSS upper L-band in the frequency domain, especially to the G1 band of GLONASS. At the UE, transmission of a NTN uplink signal on such GNSS-interfering bands may cause interference to the GNSS measurement on the L1, E1, and/or G1 band. A "GNSS-interfering band" is identified herein as a band which includes a frequency whose emission power or whose second harmonic power is at least partially within a GNSS reception band (e.g., the GNSS upper L-band (1559-1610 MHz); or the E1 (1559-1591 MHz), L1 (1563-1587 MHz), and/or G1 (1593-1610 MHz) band).

Several options for addressing a potential NTN IDC issue at the cellular side are presented. A first approach may include avoiding a potential for conflict at the connection stage. From the perspective of network deployment, for example, the network may avoid configuring a UE to have any NTN communication on a GNSS-interfering band (e.g., n14 or non-GEO-based MSS L-band UL), or the network may avoid configuring a UE to have any NTN communication if the UE already has a serving connection on a GNSS-interfering band (e.g., n14 UL or non-GEO based MSS L-band UL). (In such cases, the network may continue to configure the UE for connection to non-NTN serving cells.) An access node may be configured to apply such a restriction, for example, during the initial transition of the UE from RRC_IDLE state to RRC_CONNECTED state, during handover, and/or during cell re-selection. An access node may be configured to apply such a restriction in response to an indication of UE capability as discussed herein (e.g., an indication that the UE lacks such a capability) or, alternatively, upon a failure to receive such an indication from the UE.

From the perspective of the UE in an NTN system, UE may be configured to avoid attempting to access an NTN network or cell on a GNSS-interfering band (e.g., n14 UL or non-GEO based MSS L-band UL). For example, in an NTN system, a UE may be configured to avoid performing cell detection on downlink (DL) band n14 or non-GEO based MSS L-band DL and to avoid performing random access on uplink (UL) band n14 or non-GEO based MSS L-band UL. For a case (e.g., a carrier aggregation (CA) case) in which a network configures an NTN serving cell to a UE when the UE already has another serving connection on a GNSS-interfering band (e.g., n14 UL or non-GEO based MSS L-band UL), the UE may be configured to directly fail the NTN serving cell configuration (e.g., to fail the NTN SCell addition) or, alternatively, to perform the initial access on the NTN serving cell without the existing connection on the GNSS-interfering band (e.g., to drop the existing connection on the GNSS-interfering band, which may be a legacy NR (e.g., terrestrial) connection).

Figure 9:
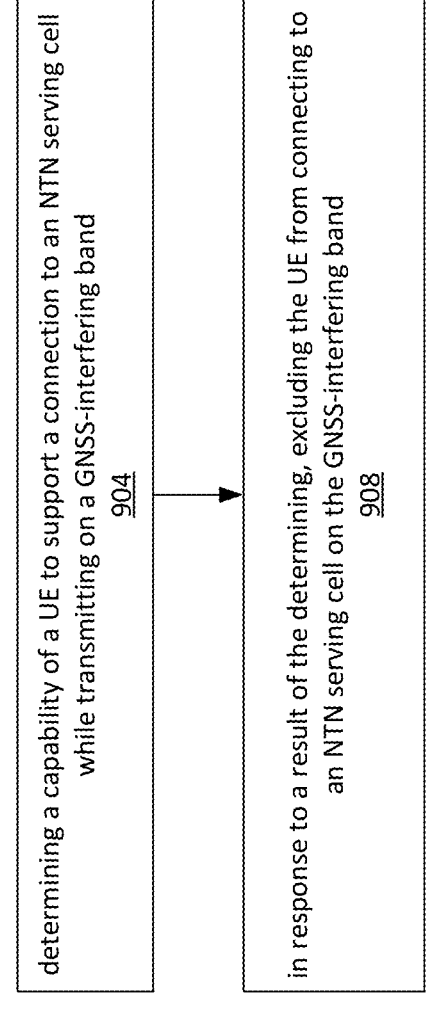
FIG. 9 illustrates an operational flow/algorithmic structure in accordance with some embodiments.

FIG. 9 illustrates an operation flow/algorithmic structure 900 in accordance with some embodiments. The operation flow/algorithmic structure 900 may be performed or implemented by an access node such as, for example, access node 108, 208, 238, or 2200; or components thereof, for example, baseband processor 2204A.

The operation flow/algorithmic structure 900 may include, at 904, determining a capability of a UE to support a connection to an NTN serving cell while transmitting on a GNSS-interfering band (e.g., on any of a predetermined plurality of bands that is a GNSS-interfering band).

The operation flow/algorithmic structure 900 may further include, at 908, in response to a result of the determining, excluding the UE from connecting to an NTN serving cell on the GNSS-interfering band. The determining may be based, for example, on a failure to receive an indication of the capability from the UE, or on an indication that the UE is not capable to support a connection to an NTN serving cell while transmitting on a GNSS-interfering band.

Figure 10:
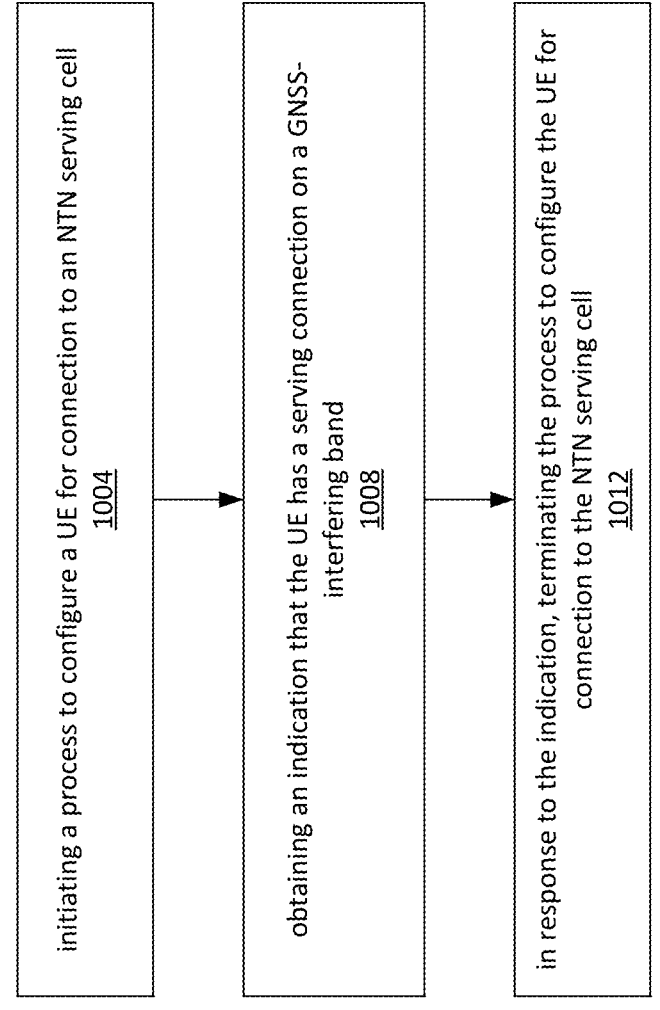
FIG. 10 illustrates an operational flow/algorithmic structure in accordance with some embodiments.

FIG. 10 illustrates an operation flow/algorithmic structure 1000 in accordance with some embodiments. The operation flow/algorithmic structure 1000 may be performed or implemented by an access node such as, for example, access node 108, 208, 238, or 2200; or components thereof, for example, baseband processor 2204A.

The operation flow/algorithmic structure 1000 may include, at 1004, initiating a process to configure a UE for connection to an NTN serving cell.

The operation flow/algorithmic structure 1000 may further include, at 1008, obtaining an indication that the UE has a serving connection on a GNSS-interfering band.

The operation flow/algorithmic structure 1000 may further include, at 1012, in response to the indication, terminating the process to configure the UE for connection to the NTN serving cell. The operation flow/algorithmic structure 1000 may further include receiving an indication of a capability of the UE to support a connection to an NTN serving cell while transmitting on a GNSS-interfering band, wherein the terminating is based on the indication.

Figure 11:
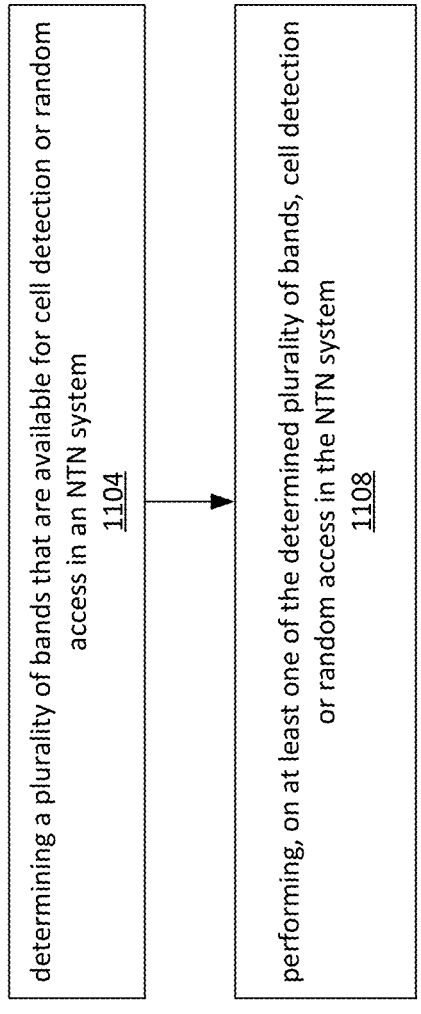
FIG. 11 illustrates an operational flow/algorithmic structure in accordance with some embodiments.

FIG. 11 illustrates an operation flow/algorithmic structure 1100 in accordance with some embodiments. The operation flow/algorithmic structure 1100 may be performed or implemented by a UE such as, for example, UE 104, UE 304, or UE 2100; or components thereof, for example, baseband processor 2104A.

The operation flow/algorithmic structure 1100 may include, at 1104, determining a plurality of bands that are available for cell detection or random access in an NTN system, wherein the plurality of bands are determined to exclude GNSS-interfering bands.

The operation flow/algorithmic structure 1100 may further include, at 1108, performing, on at least one of the determined plurality of bands, cell detection or random access in the NTN system. The operation flow/algorithmic structure 1100 may further include obtaining GNSS measurements for timing advance calculation.

An operation of obtaining GNSS measurements for timing advance calculation may include receiving GNSS signals (i.e., signals transmitted by GNSS satellites) and/or determining a code phase and/or a carrier phase for each of a plurality of received GNSS signals. An operation (e.g., by a UE) of calculating a timing advance may include acquiring a GNSS position of the UE based on the obtained GNSS measurements (e.g., a code phase and/or a carrier phase for each of a plurality of GNSS signals). The periodicity of the GNSS-based TA calculation may be in the range of, for example, from ten to one hundred milliseconds and may depend on factors such as, for example, the speed of the NTN vehicle and the speed of the UE, which may change over time. The periodicity of the GNSS-based TA calculation may less than the periodicity of a legacy GNSS measurement, which is typically on the order of one second.

Figure 12:
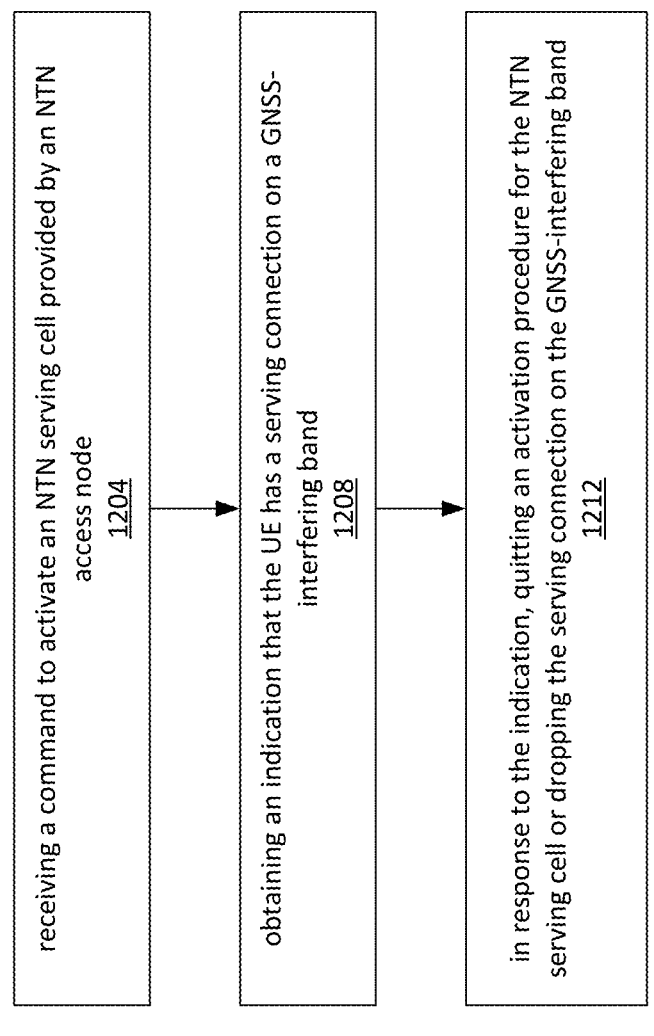
FIG. 12 illustrates an operational flow/algorithmic structure in accordance with some embodiments.

FIG. 12 illustrates an operation flow/algorithmic structure 1200 in accordance with some embodiments. The operation flow/algorithmic structure 1200 may be performed or implemented by a UE such as, for example, UE 104, UE 304, or UE 2100; or components thereof, for example, baseband processor 2104A.

The operation flow/algorithmic structure 1200 may include, at 1204, receiving a command to activate an NTN serving cell provided by an NTN access node.

The operation flow/algorithmic structure 1200 may further include, at 1208, obtaining an indication that the UE has a serving connection on a GNSS-interfering band. The serving connection on the GNSS-interfering band may be, for example, with a terrestrial New Radio (NR) serving cell.

The operation flow/algorithmic structure 1200 may further include, at 1212, and in response to the indication, quitting an activation procedure for the NTN serving cell or dropping the serving connection on the GNSS-interfering band.

A second approach may include introducing an indication of a capability of a UE to support a connection to an NTN serving cell while transmitting on a GNSS-interfering band (e.g., n14 UL or non-GEO based MSS L-band UL). In one example, the UE indicates a first capability to support an NTN connection on a GNSS-interfering band (e.g., n14 UL or non-GEO based MSS L-band UL). An indication that the UE can support such a connection may mean, for example, that the UE may reliably obtain GNSS measurements for timing advance calculation even it has a connection with a GNSS-interfering band (e.g., n14 UL or non-GEO based MSS L-band UL).

In another example, the UE indicates a second capability to add an NTN connection when it already has another serving connection (e.g., an NTN connection or a legacy NR connection) on a GNSS-interfering band (e.g., n14 UL or non-GEO based MSS L-band UL). An indication that the UE can add such a connection (e.g., to an NTN SCell for carrier aggregation) may mean, for example, that the UE may reliably obtain GNSS measurements for timing advance calculation for the new NTN connection even if it has a legacy NR connection with a GNSS-interfering band (e.g., n14 UL or non-GEO based MSS L-band UL).

In a further example, the UE indicates a third capability to add a connection on a GNSS-interfering band (e.g., n14 UL or non-GEO based MSS L-band UL) when it is already operating in an NTN connection. An indication that the UE can add such a connection (e.g., to a legacy NR (e.g., terrestrial) SCell for carrier aggregation) may mean, for example, that the UE may reliably obtain GNSS measurements for timing advance calculation for the existing NTN connection even it adds a new connection with a GNSS-interfering band (e.g., n14 UL or non-GEO based MSS L-band UL).

To support a capability (e.g., a first, second, and/or third capability) as described herein, the UE may be configured, for example, to perform interference cancellation on a received GNSS signal to reduce or cancel interference caused by the uplink transmitted signal. A UE may be configured to indicate a first, second, and/or third capability as described herein in one capability signaling (e.g., indication of a general capability to support a connection to an NTN serving cell while transmitting on a GNSS-interfering band) or multiple capability signaling (e.g., separate indications of one or more of a first, second, and/or third capability as described herein). A record of such capability may be stored, for example, in a SIM card or other non-volatile storage of the UE. In one example, the UE reports the supported bands for NTN to the network via RRC signaling, and on that signaling, the one or more GNSS-interfering bands are included (indicating that the UE is capable to support a connection to an NTN serving cell while transmitting on such a GNSS-interfering band) or are not included (indicating that the UE is not capable to support a connection to an NTN serving cell while transmitting on such a GNSS-interfering band). Such a report may be signaled in the parameter supportedBandListNR-NTN SEQUENCE (SIZE (1..maxBands)) OF BandNR, which may be included in the Information Element (IE)RF-Parameters. In one example, the UE reports the supported bands for NTN to the network via RRC signaling, and on that signaling, the one or more GNSS-interfering bands are included (indicating that the UE is capable to support a connection to an NTN serving cell while transmitting on such a GNSS-interfering band) or are not included (indicating that the UE is not capable to support a connection to an NTN serving cell while transmitting on such a GNSS-interfering band). Such a report may be signaled in the parameter supportedBandListNR-NTN SEQUENCE (SIZE (1..maxBands)) OF BandNR, which may be included in the IE RF-Parameters.

Figure 13:
FIG. 13 illustrates an operational flow/algorithmic structure in accordance with some embodiments.

FIG. 13 illustrates an operation flow/algorithmic structure 1300 in accordance with some embodiments. The operation flow/algorithmic structure 1300 may be performed or implemented by a UE such as, for example, UE 104, UE 304, or UE 2100; or components thereof, for example, baseband processor 2104A.

The operation flow/algorithmic structure 1300 may include, at 1304, transmitting an indication of a capability of the UE to support a connection to an NTN serving cell while transmitting on a GNSS-interfering band. The capability may be, for example, a capability to support a connection to an NTN serving cell on a GNSS-interfering band. Alternatively or additionally, the capability may be a capability to support a connection to an NTN serving cell during a connection to another serving cell on a GNSS-interfering band, and/or a capability to continue to support an existing connection to an NTN serving cell upon adding a connection to another serving cell on a GNSS-interfering band. In either case, the other serving cell may be a terrestrial New Radio (NR) serving cell.

The operation flow/algorithmic structure 1300 may further include, at 1308, receiving a command to activate a serving cell, wherein the command to activate is consistent with the indicated capability.

A third approach may include scheduling uplink transmissions by the UE to avoid occasions (e.g., time periods) during which the UE obtains GNSS measurements for timing advance calculation. Such an approach may be applied, for example, to a UE on an NTN network with a serving component carrier (CC) on a GNSS-interfering band (e.g., n14 UL or non-GEO based MSS L-band UL). The serving CC on the GNSS-interfering band may be to an NTN serving cell or to a legacy NR (e.g., terrestrial) serving cell. In one example, the UE may provide GNSS measurement occasion information (e.g., timing information, which may include duration, offset, and/or periodicity) to the network. Alternatively or additionally, the UE may request a measurement gap (MG) pattern for GNSS measurement (for example, like a legacy positioning request as described in 3GPP TS 38.331 V16.4.1 (2021-04)). In response to the GNSS measurement occasion information and/or the MG pattern request, the network may configure a measurement gap or other protection time gap to cover the GNSS measurement occasion. For example, the network may configure a measurement gap or other protection time gap in accordance with the GNSS measurement occasion information provided by the UE. Within such a measurement gap or protection time gap, the UE may be permitted to mute transmit signals, or otherwise to reduce transmission power, on the GNSS-interfering band. For example, the UE may be permitted to not transmit anything on the GNSS-interfering connection during the measurement gap, such that the UE may focus on obtaining GNSS measurements for timing advance calculation during the measurement gap.

Figure 14:
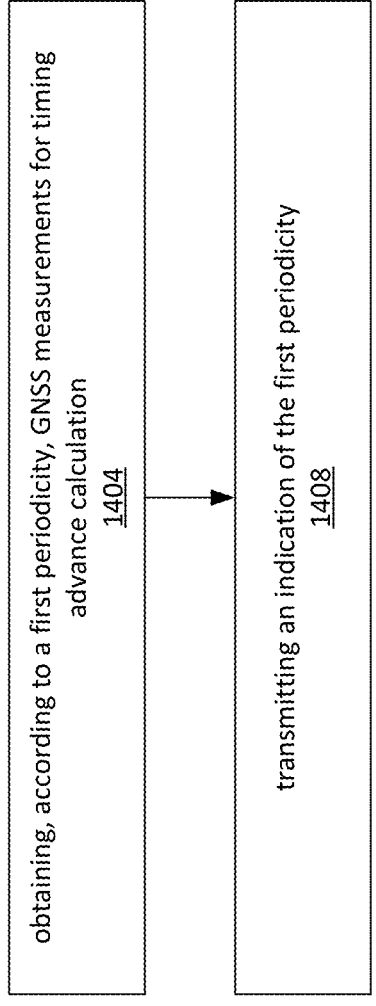
FIG. 14 illustrates an operational flow/algorithmic structure in accordance with some embodiments.

FIG. 14 illustrates an operation flow/algorithmic structure 1400 in accordance with some embodiments. The operation flow/algorithmic structure 1400 may be performed or implemented by a UE such as, for example, UE 104, UE 304, or UE 2100; or components thereof, for example, baseband processor 2104A.

The operation flow/algorithmic structure 1400 may include, at 1404, obtaining, according to first timing information, GNSS measurements for timing advance calculation. The operation flow/algorithmic structure 1400 may include storing the obtained GNSS measurements in a memory.

The operation flow/algorithmic structure 1400 may further include, at 1408, transmitting an indication of the first timing information. The operation flow/algorithmic structure 1400 may further include receiving a gap pattern that is based on the indication of the first timing information, and may further include muting, in accordance with the gap pattern, an uplink transmission on a GNSS-interfering band. The uplink transmission may be to an NTN serving cell or may be to a terrestrial NR serving cell.

Figure 15:
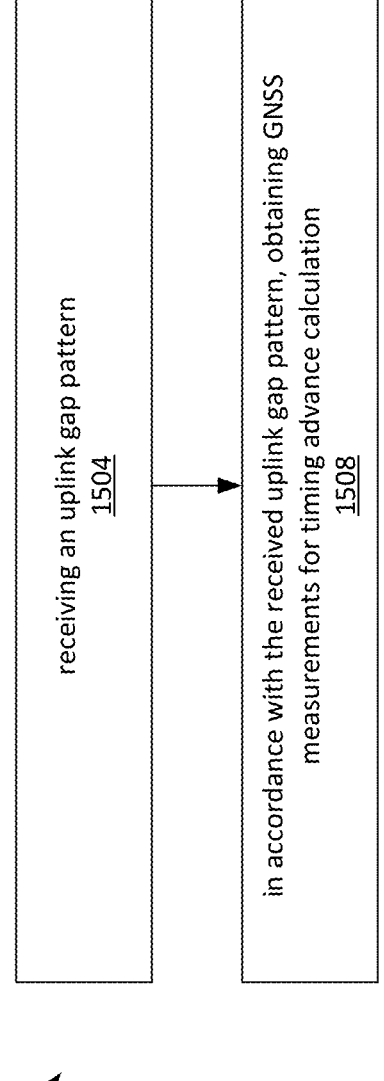
FIG. 15 illustrates an operational flow/algorithmic structure in accordance with some embodiments.

FIG. 15 illustrates an operation flow/algorithmic structure 1500 in accordance with some embodiments. The operation flow/algorithmic structure 1500 may be performed or implemented by a UE such as, for example, UE 104, UE 304, or UE 2100; or components thereof, for example, baseband processor 2104A.

The operation flow/algorithmic structure 1500 may include, at 1504, receiving a gap pattern.

The operation flow/algorithmic structure 1500 may further include, at 1508, and in accordance with the received gap pattern, obtaining GNSS measurements for timing advance calculation. The operation flow/algorithmic structure 1500 may further include transmitting a request for the gap pattern and/or storing the obtained GNSS measurements in a memory.

A fourth approach may include defining some priority between the GNSS measurements for timing advance calculation and the uplink transmission on the interfering band, such as prioritizing obtaining GNSS measurements by the UE for NTN timing advance calculation over uplink transmissions by the UE on a GNSS-interfering band (e.g., n14 UL or non-GEO based MSS L-band UL). In one such example, a NTN UE with a serving component carrier (CC) on a GNSS-interfering band (e.g., n14 UL or non-GEO based MSS L-band UL) would prioritize obtaining GNSS measurements over UL transmission on the GNSS-interfering band, if the GNSS measurements are for TA calculation. In one example, the UE may be configured to mute the UL transmission on the GNSS-interfering band when the UE is obtaining GNSS measurements for TA calculation and the GNSS measurement collides in time (e.g., overlaps) with the UL transmission on the GNSS-interfering band. In another example, the UE may be configured to reduce the UL transmission power on the GNSS-interfering band when the UE is obtaining GNSS measurements for TA calculation and the GNSS measurement collides in time (e.g., overlaps) with the UL transmission on the GNSS-interfering band. The uplink transmissions on the GNSS-interfering band may occur according to a schedule provided by the network, and the GNSS measurements may be obtained periodically by the UE, such that the UE may be aware of such a collision in advance. In either case, the network may respond to a failure to receive the expected UL transmission with a negative acknowledgement (NACK) and/or a command to reschedule the uplink transmission.

Figure 16:
FIG. 16 illustrates an operational flow/algorithmic structure in accordance with some embodiments.

FIG. 16 illustrates an operation flow/algorithmic structure 1600 in accordance with some embodiments. The operation flow/algorithmic structure 1600 may be performed or implemented by a UE such as, for example, UE 104, UE 304, or UE 2100; or components thereof, for example, baseband processor 2104A.

The operation flow/algorithmic structure 1600 may include, at 1604, obtaining, over a first time period, GNSS measurements for timing advance calculation.

The operation flow/algorithmic structure 1600 may further include, at 1608, muting or otherwise reducing a transmit power of an uplink transmission on a GNSS-interfering band that is scheduled to occur during the first period. The muting or otherwise reducing may occurs in response to a determination that an uplink transmission on the GNSS-interfering band is colliding with (e.g., overlaps in time) a GNSS measurement for timing advance calculation.

A fifth approach may include an indication to the UE, by the network, regarding a priority between obtaining GNSS measurements by the UE for timing advance calculation and uplink transmissions by the UE on a GNSS-interfering band (e.g., n14 UL or non-GEO based MSS L-band UL). In an NTN network, the network may be configured to control whether obtaining GNSS measurements for TA calculation shall be prioritized or not. For example, if the access node signals to the UE to prioritize obtaining GNSS measurements, then UE may be configured to prioritize obtaining GNSS measurements for TA calculation over UL transmission on the GNSS-interfering band as described above, and the network may expect interruption on UL transmission from the UE due to such GNSS measurement prioritization. Alternatively, if the access node does not signal to the UE to prioritize such obtaining GNSS measurements, then the UE may be configured to maintain a legacy UL transmission as scheduled on a GNSS-interfering band even though such transmission may interfere with obtaining GNSS measurements for TA calculation. An access node may be configured to signal such a prioritization to the UE in response to an indication of UE capability to support a connection to an NTN serving cell while transmitting on a GNSS-interfering band as discussed herein (e.g., an indication that the UE lacks such a capability) or, alternatively, upon a failure to receive such an indication from the UE.

Figure 17:
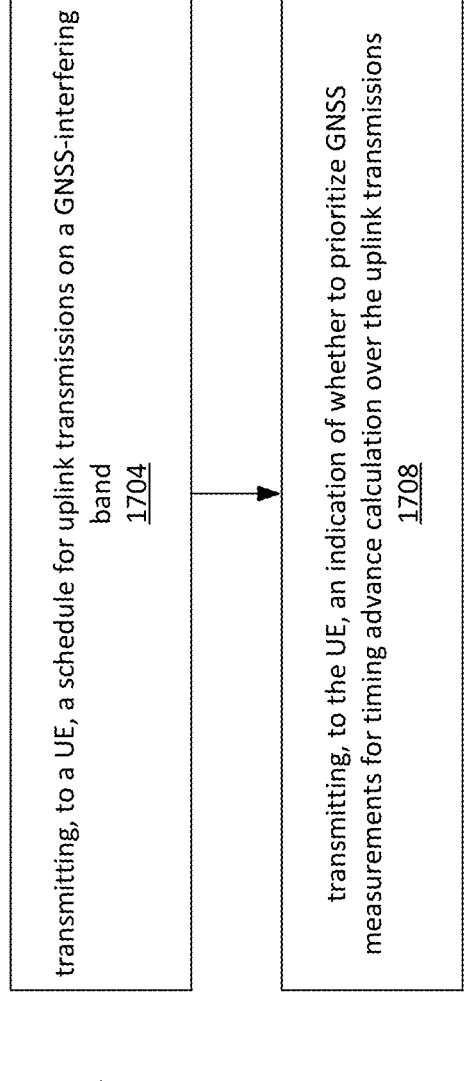
FIG. 17 illustrates an operational flow/algorithmic structure in accordance with some embodiments.

FIG. 17 illustrates an operation flow/algorithmic structure 1700 in accordance with some embodiments. The operation flow/algorithmic structure 1700 may be performed or implemented by an access node such as, for example, access node 108, 208, 238, or 2200; or components thereof, for example, baseband processor 2204A.

The operation flow/algorithmic structure 1700 may include, at 1704, transmitting, to a UE, a schedule for uplink transmissions on a GNSS-interfering band.

The operation flow/algorithmic structure 1700 may further include, at 1708, transmitting, to the UE, an indication of whether to prioritize GNSS measurements for timing advance calculation over the uplink transmissions on the GNSS-interfering band. The indication may comprise an indication of whether to modify a scheduled uplink transmission on the GNSS-interfering band that overlaps a scheduled GNSS measurement for timing advance calculation. The operation flow/algorithmic structure 1700 may further include receiving an indication of a capability of the UE to support a connection to an NTN serving cell while transmitting on a GNSS-interfering band, wherein the indication of whether to prioritize may be based on the indication of the capability.

Several options for addressing a potential NTN IDC issue at the GNSS side are also presented. A first approach may include avoiding obtaining GNSS measurements for timing advance calculation on the GNSS upper L-Band. For example, a UE may be configured to avoid obtaining GNSS measurements for timing advance calculation on the GNSS upper L-Band when the UE is operating in an NTN network with a GNSS-interfering band (e.g., n14 UL or non-GEO based MSS L-band UL). On such occasions, a UE with the capability to do so may use the GNSS lower L-Band instead for obtaining GNSS measurements for timing advance calculation. Alternatively, the UE may be configured to abstain from obtaining GNSS measurements for timing advance calculation during GNSS measurement occasions that overlap with UL transmission on the GNSS-interfering band.

Figure 18:
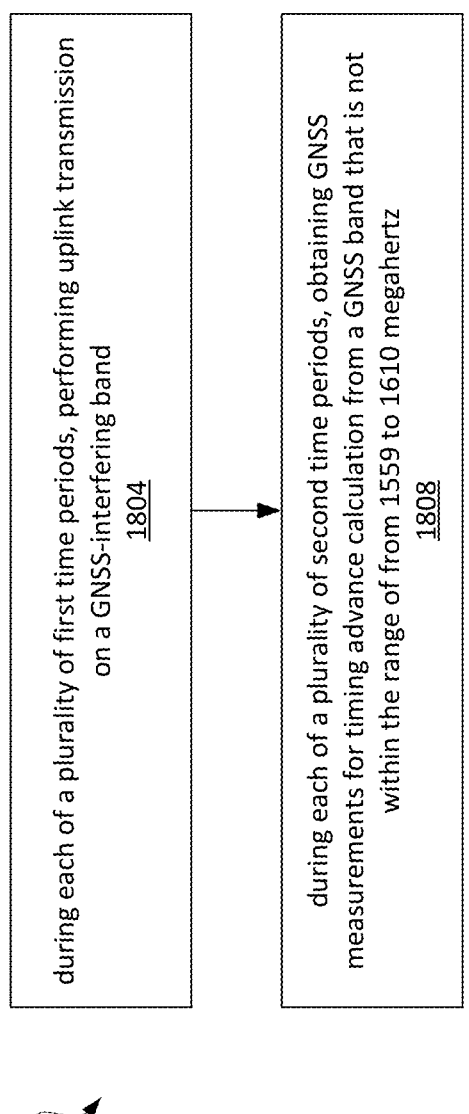
FIG. 18 illustrates an operational flow/algorithmic structure in accordance with some embodiments.

FIG. 18 illustrates an operation flow/algorithmic structure 1800 in accordance with some embodiments. The operation flow/algorithmic structure 1800 may be performed or implemented by a UE such as, for example, UE 104, UE 304, or UE 2100; or components thereof, for example, baseband processor 2104A.

The operation flow/algorithmic structure 1800 may include, at 1804, during each of a plurality of first time periods, performing uplink transmission on a GNSS-interfering band. The uplink transmission may be, for example, to an NTN serving cell.

The operation flow/algorithmic structure 1800 may further include, at 1808, during each of a plurality of second time periods, obtaining GNSS measurements for timing advance calculation from a GNSS band that is not within the range of from 1559 to 1610 megahertz.

FIG. 19 illustrates an operation flow/algorithmic structure 1900 in accordance with some embodiments. The operation flow/algorithmic structure 1900 may be performed or implemented by a UE such as, for example, UE 104, UE 304, or UE 2100; or components thereof, for example, baseband processor 2104A.

The operation flow/algorithmic structure 1900 may include, at 1904, during each of a plurality of first time periods, performing uplink transmission on a GNSS-interfering band. The uplink transmission may be, for example, to a terrestrial NR serving cell or to an NTN serving cell.

The operation flow/algorithmic structure 1900 may further include, at 1908, identifying a plurality of second time periods configured for GNSS measurements for timing advance calculation.

The operation flow/algorithmic structure 1900 may further include, at 1908, during a first set of the plurality of second time periods, obtaining GNSS measurements for the timing advance calculation, wherein the first set does not overlap with the plurality of first time periods.

The operation flow/algorithmic structure 1900 may further include, at 1908, during a second set of the plurality of second time periods, abstain from obtaining GNSS measurements, wherein the second set overlaps with the plurality of first time periods.

A second approach may include avoiding obtaining GNSS measurements for timing advance calculation on the GNSS upper L-Band during GNSS measurement occasions that overlap with uplink transmission on a GNSS-interfering band (e.g., n14 UL or non-GEO based MSS L-band UL). For example, a UE may be configured to avoid obtaining GNSS measurements for timing advance calculation on the GNSS upper L-Band (e.g., on the L1 and/or E1 band), when the UE is operating in an NTN network with a GNSS-interfering band (e.g., n14 UL or non-GEO based MSS L-band UL), during time periods (e.g., GNSS measurement occasions, slots, or symbols) that overlap with uplink transmission on the GNSS-interfering band. The UE may be configured, for example, to use another GNSS band to obtain GNSS measurements for timing advance calculation during those overlapped occasions, slots, or symbols, such as the GNSS lower L-Band.

FIG. 20 illustrates an operation flow/algorithmic structure 2000 in accordance with some embodiments. The operation flow/algorithmic structure 2000 may be performed or implemented by a UE such as, for example, UE 104, UE 304, or UE 2100; or components thereof, for example, baseband processor 2104A.

The operation flow/algorithmic structure 2000 may include, at 2004, during each of a plurality of first time periods, performing uplink transmission on a GNSS-interfering band. The uplink transmission may be, for example, to a terrestrial NR serving cell or to an NTN serving cell.

The operation flow/algorithmic structure 2000 may further include, at 2008, during each of a plurality of second time periods, obtaining GNSS measurements for timing advance calculation. Such an operation may include, at 2012, during any of the plurality of second time periods that overlap with any of the first time periods, obtaining the corresponding GNSS measurements from a GNSS band that is not within the range of from 1559 to 1610 megahertz. Such an operation may also include, during any of the plurality of second time periods that does not overlap with any of the first time periods, obtaining the corresponding GNSS measurements from a GNSS band that is within the range of from 1559 to 1610 megahertz.

Figure 21:
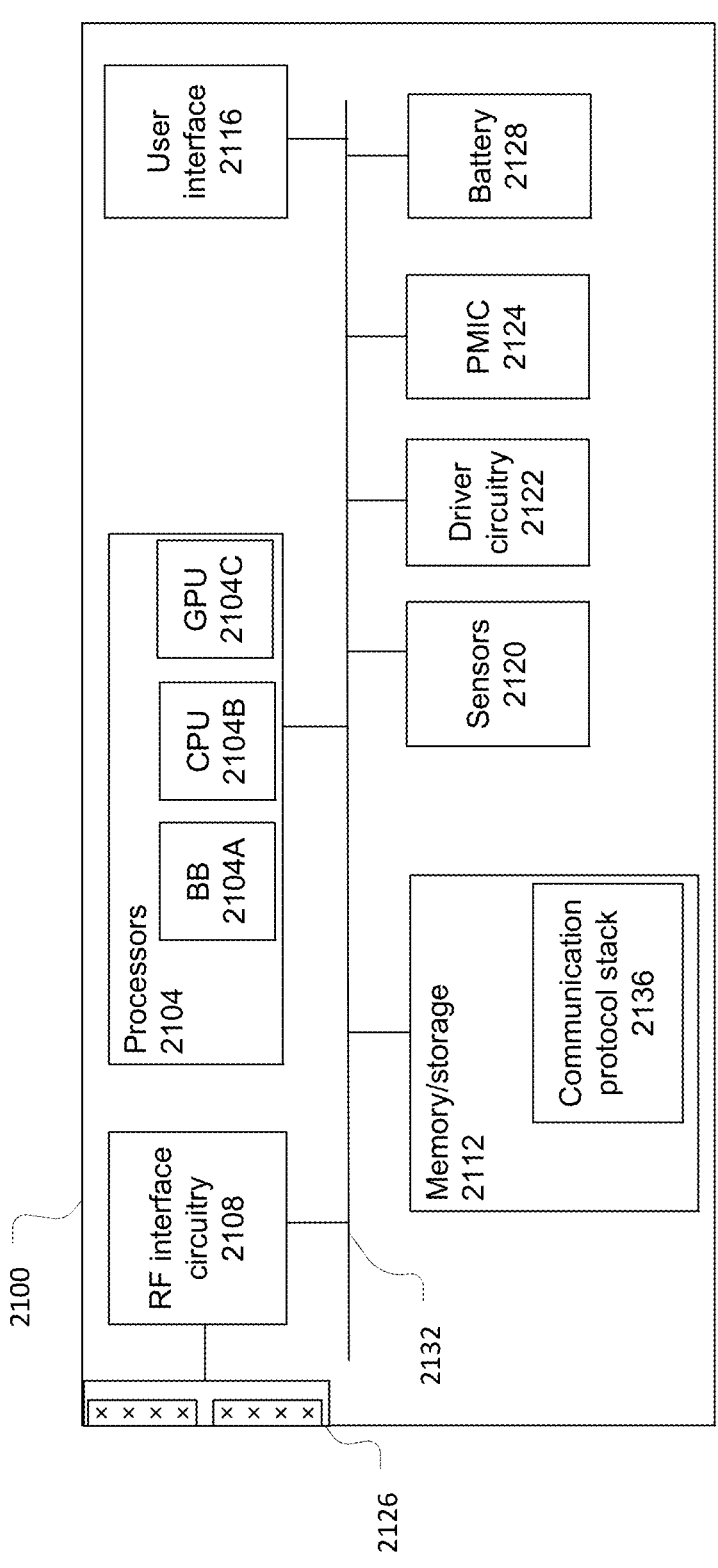
FIG. 21 illustrates a user equipment in accordance with some embodiments.

FIG. 21 illustrates a UE 2100 in accordance with some embodiments. The UE 2100 may be similar to and substantially interchangeable with UE 104 of FIGS. 1 and 2 or UE 304 of FIG. 3.

The UE 2100 may be any mobile or non-mobile computing device, such as, for example, mobile phones, computers, tablets, industrial wireless sensors (for example, microphones, carbon dioxide sensors, pressure sensors, humidity sensors, thermometers, motion sensors, accelerometers, laser scanners, fluid level sensors, inventory sensors, electric voltage/current meters, actuators, etc.), video surveillance/monitoring devices (for example, cameras, video cameras, etc.), wearable devices (for example, a smart watch), relaxed-IoT devices.

The UE 2100 may include processors 2104, RF interface circuitry 2108, memory/storage 2112, user interface 2116, sensors 2120, driver circuitry 2122, power management integrated circuit (PMIC) 2124, antenna structure 2126, and battery 2128. The components of the UE 2100 may be implemented as integrated circuits (ICs), portions thereof, discrete electronic devices, or other modules, logic, hardware, software, firmware, or a combination thereof. The block diagram of FIG. 21 is intended to show a high-level view of some of the components of the UE 2100. However, some of the components shown may be omitted, additional components may be present, and different arrangement of the components shown may occur in other implementations.

The components of the UE 2100 may be coupled with various other components over one or more interconnects 2132, which may represent any type of interface, input/output, bus (local, system, or expansion), transmission line, trace, optical connection, etc. that allows various circuit components (on common or different chips or chipsets) to interact with one another.

The processors 2104 may include processor circuitry such as, for example, baseband processor circuitry (BB) 2104A, central processor unit circuitry (CPU) 2104B, and graphics processor unit circuitry (GPU) 2104C. The processors 2104 may include any type of circuitry or processor circuitry that executes or otherwise operates computer-executable instructions, such as program code, software modules, or functional processes from memory/storage 2112 to cause the UE 2100 to perform operations as described herein.

In some embodiments, the baseband processor circuitry 2104A may access a communication protocol stack 2136 in the memory/storage 2112 to communicate over a 3GPP compatible network. In general, the baseband processor circuitry 2104A may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum layer. In some embodiments, the PHY layer operations may additionally/alternatively be performed by the components of the RF interface circuitry 2108.

The baseband processor circuitry 2104A may generate or process baseband signals or waveforms that carry information in 3GPP-compatible networks. In some embodiments, the waveforms for NR may be based cyclic prefix OFDM "CP-OFDM" in the uplink or downlink, and discrete Fourier transform spread OFDM "DFT-S-OFDM" in the uplink.

The memory/storage 2112 may include one or more non-transitory, computer-readable media that includes instructions (for example, communication protocol stack 2136) that may be executed by one or more of the processors 2104 to cause the UE 2100 to perform various operations described herein. The memory/storage 2112 include any type of volatile or non-volatile memory that may be distributed throughout the UE 2100. In some embodiments, some of the memory/storage 2112 may be located on the processors 2104 themselves (for example, L1 and L2 cache), while other memory/storage 2112 is external to the processors 2104 but accessible thereto via a memory interface. The memory/storage 2112 may include any suitable volatile or non-volatile memory such as, but not limited to, dynamic random access memory (DRAM), static random access memory (SRAM), eraseable programmable read only memory (EPROM), electrically eraseable programmable read only memory (EEPROM), Flash memory, solid-state memory, or any other type of memory device technology.

The RF interface circuitry 2108 may include transceiver circuitry and radio frequency front module (RFEM) that allows the UE 2100 to communicate with other devices over a radio access network. The RF interface circuitry 2108 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via antenna structure 2126 and proceed to filter and amplify (with a low-noise amplifier) the signal. The signal may be provided to a receiver of the transceiver that down-converts the RF signal into a baseband signal that is provided to the baseband processor of the processors 2104.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antenna 2126.

In various embodiments, the RF interface circuitry 2108 may be configured to transmit/receive signals in a manner compatible with NR access technologies.

The antenna 2126 may include antenna elements to convert electrical signals into radio waves to travel through the air and to convert received radio waves into electrical signals. The antenna elements may be arranged into one or more antenna panels. The antenna 2126 may have antenna panels that are omnidirectional, directional, or a combination thereof to enable beamforming and multiple input, multiple output communications. The antenna 2126 may include microstrip antennas, printed antennas fabricated on the surface of one or more printed circuit boards, patch antennas, phased array antennas, etc. The antenna 2126 may have one or more panels designed for specific frequency bands including bands in FR1 or FR2.

The user interface circuitry 2116 includes various input/output (I/O) devices designed to enable user interaction with the UE 2100. The user interface 2116 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, or the like. The output device circuitry includes any physical or virtual means for showing information or otherwise conveying information, such as sensor readings, actuator position(s), or other like information. Output device circuitry may include any number or combinations of audio or visual display, including, inter alia, one or more simple visual outputs/indicators (for example, binary status indicators such as light emitting diodes "LEDs" and multi-character visual outputs, or more complex outputs such as display devices or touchscreens (for example, liquid crystal displays "LCDs," LED displays, quantum dot displays, projectors, etc.), with the output of characters, graphics, multimedia objects, and the like being generated or produced from the operation of the UE 2100.

The sensors 2120 may include devices, modules, or subsystems whose purpose is to detect events or changes in its environment and send the information (sensor data) about the detected events to some other device, module, subsystem, etc. Examples of such sensors include, inter alia, inertia measurement units comprising accelerometers, gyroscopes, or magnetometers; microelectromechanical systems or nanoelectromechanical systems comprising 3-axis accelerometers, 3-axis gyroscopes, or magnetometers; level sensors; flow sensors; temperature sensors (for example, thermistors); pressure sensors; barometric pressure sensors; gravimeters; altimeters; image capture devices (for example, cameras or lensless apertures); light detection and ranging sensors; proximity sensors (for example, infrared radiation detector and the like); depth sensors; ambient light sensors; ultrasonic transceivers; microphones or other like audio capture devices; etc.

The driver circuitry 2122 may include software and hardware elements that operate to control particular devices that are embedded in the UE 2100, attached to the UE 2100, or otherwise communicatively coupled with the UE 2100. The driver circuitry 2122 may include individual drivers allowing other components to interact with or control various input/output (I/O) devices that may be present within, or connected to, the UE 2100. For example, driver circuitry 2122 may include a display driver to control and allow access to a display device, a touchscreen driver to control and allow access to a touchscreen interface, sensor drivers to obtain sensor readings of sensor circuitry 2120 and control and allow access to sensor circuitry 2120, drivers to obtain actuator positions of electro-mechanic components or control and allow access to the electro-mechanic components, a camera driver to control and allow access to an embedded image capture device, audio drivers to control and allow access to one or more audio devices.

The PMIC 2124 may manage power provided to various components of the UE 2100. In particular, with respect to the processors 2104, the PMIC 2124 may control power-source selection, voltage scaling, battery charging, or DC-to-DC conversion.

In some embodiments, the PMIC 2124 may control, or otherwise be part of, various power saving mechanisms of the UE 2100 including DRX as discussed herein.

A battery 2128 may power the UE 2100, although in some examples the UE 2100 may be mounted deployed in a fixed location, and may have a power supply coupled to an electrical grid. The battery 2128 may be a lithium ion battery, a metal-air battery, such as a zinc-air battery, an aluminum-air battery, a lithium-air battery, and the like. In some implementations, such as in vehicle-based applications, the battery 2128 may be a typical lead-acid automotive battery.

Figure 22:
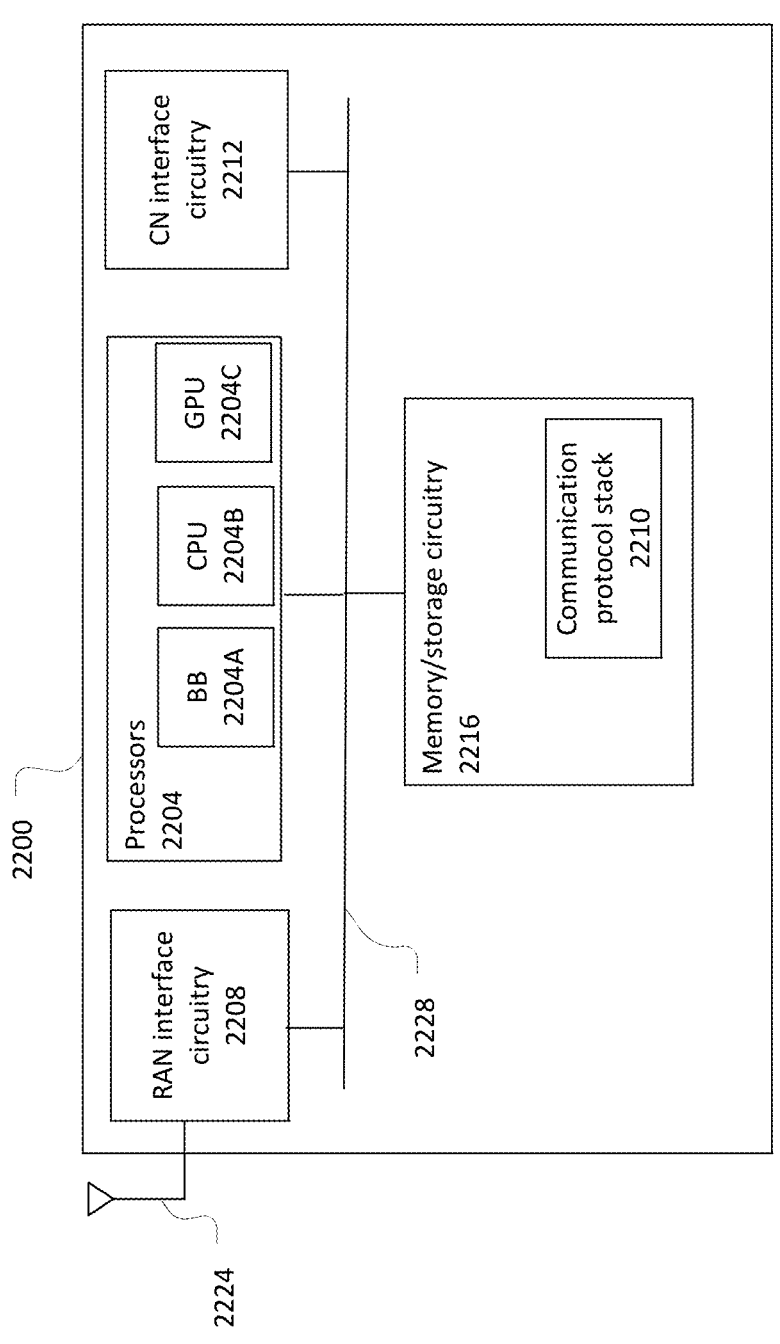
FIG. 22 illustrates an access node in accordance with some embodiments.

FIG. 22 illustrates an access node 2200 (e.g., a gNB) in accordance with some embodiments. The access node 2200 may similar to and substantially interchangeable with access node 108, 208, and/or 238.

The access node 2200 may include processors 2204, RF interface circuitry 2208, core network (CN) interface circuitry 2212, memory/storage circuitry 2216, and antenna structure 2226.

The components of the access node 2200 may be coupled with various other components over one or more interconnects 2228.

The processors 2204, RF interface circuitry 2208, memory/storage circuitry 2216 (including communication protocol stack 2210), antenna structure 2226, and interconnects 2228 may be similar to like-named elements shown and described with respect to FIG. 21.

The CN interface circuitry 2212 may provide connectivity to a core network, for example, a $5^{th}$ Generation Core network (5GC) using a 5GC-compatible network interface protocol such as carrier Ethernet protocols, or some other suitable protocol. Network connectivity may be provided to/from the access node 2200 via a fiber optic or wireless backhaul. The CN interface circuitry 2212 may include one or more dedicated processors or FPGAs to communicate using one or more of the aforementioned protocols. In some implementations, the CN interface circuitry 2212 may include multiple controllers to provide connectivity to other networks using the same or different protocols.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 includes a method of operating an access node, the method comprising: determining a capability of a UE to support a connection to an NTN serving cell while transmitting on a GNSS-interfering band; and in response to the determining, excluding the UE from connecting to an NTN serving cell on a GNSS-interfering band (e.g., on any of a predetermined plurality of bands that is a GNSS-interfering band).

Example 2 includes the method of example 1 or some other example herein, wherein the determining is based on a failure to receive an indication of the capability from the UE. Alternatively, the determining may be based on an indication that the UE is not capable to support a connection to an NTN serving cell while transmitting on a GNSS-interfering band.

Example 3 includes a method of operating an access node, the method comprising: initiating a process to configure a UE for connection to an NTN serving cell; obtaining an indication that the UE has a serving connection on a GNSS-interfering band; and in response to the indication, terminating the process to configure the UE for connection to the NTN serving cell.

Example 4 includes the method of example 3 or some other example herein, wherein the method further comprises receiving an indication of a capability of the UE to support a connection to an NTN serving cell while transmitting on a GNSS-interfering band, wherein the terminating is based on the indication.

Example 5 includes a method of operating a UE, the method comprising: determining a plurality of bands that are available for cell detection or random access in an NTN system, wherein the plurality of bands are determined to exclude GNSS-interfering bands; and performing, on at least one of the determined plurality of bands, cell detection or random access in the NTN system.

Example 6 includes the method of example 5 or some other example herein, wherein the method further comprises obtaining GNSS measurements for timing advance calculation.

Example 7 includes a method of operating a UE, the method comprising: receiving a command to activate an NTN serving cell provided by an NTN access node; obtaining an indication that the UE has a serving connection on a GNSS-interfering band; and in response to the indication: quitting an activation procedure for the NTN serving cell, or dropping the serving connection on the GNSS-interfering band.

Example 8 includes the method of Example 7 or some other example herein, wherein the serving connection on the GNSS-interfering band is with a terrestrial New Radio (NR) serving cell.

Example 9 includes a method of operating a UE, the method comprising: transmitting an indication of a capability of the UE to support a connection to an NTN serving cell while transmitting on a GNSS-interfering band; and receiving a command to activate a serving cell, wherein the command to activate is consistent with the indicated capability.

Example 10 includes the method of Example 9 or some other example herein, wherein the capability is a capability to support a connection to an NTN serving cell on a GNSS-interfering band.

Example 11 includes the method of Example 9 or some other example herein, wherein the capability is a capability to support a connection to an NTN serving cell during a connection to another serving cell on a GNSS-interfering band.

Example 12 includes the method of Example 9 or some other example herein, wherein the capability is a capability to continue to support an existing connection to an NTN serving cell upon adding a connection to another serving cell on a GNSS-interfering band.

Example 13 includes the method of Example 11 or 12 or some other example herein, wherein the other serving cell is a terrestrial NR serving cell.

Example 14 includes a method of operating a UE, the method comprising: obtaining, according to first timing information, GNSS measurements for timing advance calculation; and transmitting an indication of the first timing information.

Example 15 includes the method of Example 14 or some other example herein, wherein the processing circuitry is further to receive a gap pattern that is based on the indication of the first timing information.

Example 16 includes the method of Example 15 or some other example herein, wherein the processing circuitry is further to mute, in accordance with the gap pattern, an uplink transmission on a GNSS-interfering band.

Example 17 includes the method of Example 16 or some other example herein, wherein the uplink transmission is to an NTN serving cell.

Example 18 includes the method of Example 16 or some other example herein, wherein the uplink transmission is to a terrestrial NR serving cell.

Example 19 includes a method of operating a UE, the method comprising: receiving a gap pattern; and in accordance with the received gap pattern, obtaining GNSS measurements for timing advance calculation.

Example 20 includes the method of Example 19 or some other example herein, wherein the processing circuitry is further to transmit a request for the gap pattern.

Example 21 includes a method of operating a UE, the method comprising: obtaining, over a first time period, GNSS measurements for timing advance calculation; and muting or otherwise reducing a transmit power of an uplink transmission on a GNSS-interfering band that is scheduled to occur during the first period.

Example 22 includes the method of Example 21 or some other example herein, wherein the muting or otherwise reducing occurs in response to a determination that an uplink transmission on the GNSS-interfering band is colliding with a GNSS measurement for timing advance calculation.

Example 23 includes a method of operating an access node, the method comprising: transmitting, to a UE, a schedule for uplink transmissions on a GNSS-interfering band; and transmitting, to the UE, an indication of whether to prioritize GNSS measurements for timing advance calculation over the uplink transmissions on the GNSS-interfering band.

Example 24 includes the method of Example 23 or some other example herein, wherein the indication comprises an indication of whether to modify a scheduled uplink transmission on the GNSS-interfering band that overlaps a scheduled GNSS measurement for timing advance calculation.

Example 25 includes the method of Example 23 or some other example herein, wherein the method further comprises receiving an indication of a capability of the UE to support a connection to an NTN serving cell while transmitting on a GNSS-interfering band, wherein the indication of whether to prioritize is based on the indication of the capability.

Example 26 includes a method of operating a UE, the method comprising: during each of a plurality of first time periods, performing uplink transmission on a GNSS-interfering band; and during each of a plurality of second time periods, obtaining GNSS measurements for timing advance calculation from a GNSS band that is not within the range of from 1559 to 1610 megahertz.

Example 27 includes the method of Example 26 or some other example herein, wherein the uplink transmission is to an NTN serving cell.

Example 28 includes a method of operating a UE, the method comprising: during each of a plurality of first time periods, performing uplink transmission on a GNSS-interfering band; identifying a plurality of second time periods configured for GNSS measurements for timing advance calculation; during a first set of the plurality of second time periods, obtaining GNSS measurements for the timing advance calculation, wherein the first set does not overlap with the plurality of first time periods; and during a second set of the plurality of second time periods, abstaining from obtaining GNSS measurements, wherein the second set overlaps with the plurality of first time periods.

Example 29 includes the method of Example 28 or some other example herein, wherein the uplink transmission is to a terrestrial NR serving cell.

Example 30 includes the method of Example 28 or some other example herein, wherein the uplink transmission is to an NTN serving cell.

Example 31 includes a method of operating a UE, the method comprising: during each of a plurality of first time periods, performing uplink transmission on a GNSS-interfering band; and during each of a plurality of second time periods, obtaining GNSS measurements for timing advance calculation, the method further comprising, during any of the plurality of second time periods that overlap with any of the first time periods, obtaining the corresponding GNSS measurements from a GNSS band that is not within the range of from 1559 to 1610 megahertz.

Example 32 includes the method of Example 31 or some other example herein, wherein the method further comprises, during any of the plurality of second time periods that does not overlap with any of the first time periods, obtaining the corresponding GNSS measurements from a GNSS band that is within the range of from 1559 to 1610megahertz.

Example 33 includes the method of Example 31 or some other example herein, wherein the uplink transmission is to an NTN serving cell.

Example 34 may include an apparatus comprising means to perform one or more elements of a method described in or related to any of examples 1-33, or any other method or process described herein.

Example 35 may include one or more non-transitory computer-readable media comprising instructions to cause an electronic device, upon execution of the instructions by one or more processors of the electronic device, to perform one or more elements of a method described in or related to any of examples 1-33, or any other method or process described herein.

Example 36 may include an apparatus comprising logic, modules, or circuitry to perform one or more elements of a method described in or related to any of examples 1-33, or any other method or process described herein.

Example 37 may include a method, technique, or process as described in or related to any of examples 1-33, or portions or parts thereof.

Example 38 may include an apparatus comprising: one or more processors and one or more computer-readable media comprising instructions that, when executed by the one or more processors, cause the one or more processors to perform the method, techniques, or process as described in or related to any of examples 1-33, or portions thereof.

Example 39 may include a signal as described in or related to any of examples 1-33, or portions or parts thereof.

Example 40 may include a datagram, information element, packet, frame, segment, PDU, or message as described in or related to any of examples 1-33, or portions or parts thereof, or otherwise described in the present disclosure.

Example 41 may include a signal encoded with data as described in or related to any of examples 1-33, or portions or parts thereof, or otherwise described in the present disclosure.

Example 42 may include a signal encoded with a datagram, IE, packet, frame, segment, PDU, or message as described in or related to any of examples 1-33, or portions or parts thereof, or otherwise described in the present disclosure.

Example 43 may include an electromagnetic signal carrying computer-readable instructions, wherein execution of the computer-readable instructions by one or more processors is to cause the one or more processors to perform the method, techniques, or process as described in or related to any of examples 1-33, or portions thereof.

Example 44 may include a computer program comprising instructions, wherein execution of the program by a processing element is to cause the processing element to carry out the method, techniques, or process as described in or related to any of examples 1-33, or portions thereof.

Example 45 may include a signal in a wireless network as shown and described herein.

Example 46 may include a method of communicating in a wireless network as shown and described herein.

Example 47 may include a system for providing wireless communication as shown and described herein.

Example 48 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus comprising:
   processing circuitry to:
   identify a configuration indicating that obtaining Global Navigation Satellite System (GNSS) measurement is prioritized over uplink (UL) transmission on a GNSS-interfering band, the configuration being from a non-terrestrial network (NTN) serving cell, the GNSS-interfering band being the n14 band;
   obtain at least one GNSS measurement; and
   in accordance with the configuration, reduce a transmission power of an uplink transmission corresponding to a component carrier on the GNSS-interfering band while obtaining the at least one GNSS measurement; and
   interface circuitry coupled with the processing circuitry, the interface circuitry to receive the configuration.

2. The apparatus according to claim 1, wherein the processing circuitry is further to generate an indication of a first timing information for obtaining the at least one GNSS measurement, wherein the configuration includes a gap pattern that is based on the indication of the first timing information.

3. The apparatus according to claim 1, wherein the uplink transmission is to the NTN serving cell.

4. The apparatus according to claim 1, wherein the uplink transmission is to a terrestrial New Radio (NR) serving cell.

5. The apparatus according to claim 1, wherein the processing circuitry is further to generate a request for a gap pattern for transmission.

6. The apparatus according to claim 1, wherein the configuration includes a gap pattern.

7. The apparatus according to claim 1, wherein to reduce the transmission power of the uplink transmission includes to mute the transmission power of the uplink transmission.

8. The apparatus according to claim 1, wherein the uplink transmission is transmitted within a measurement gap corresponding to the at least one GNSS measurement.

9. The apparatus of claim 1, wherein the configuration indicates that obtaining GNSS measurement is prioritized over UL transmission when GNSS measurement is for timing advance.

10. The apparatus of claim 1, wherein the transmission power of the uplink transmission is reduced based on the uplink transmission colliding in time with the at least one GNSS measurement.

11. The apparatus of claim 1, wherein the processing circuitry further comprises to:

identify a schedule for uplink transmissions received from the NTN serving cell; and identify that the at least one GNSS measurement collides with the uplink transmission based on the schedule, wherein the transmission power of the uplink transmission is reduced based on the identification that the at least one GNSS measurement collides with the uplink transmission.

12. A method comprising:

identifying, from a user equipment (UE) on a non-terrestrial network (NTN), an indication of UE capability to support a connection to an NTN serving cell while transmitting on a Global Navigation Satellite System (GNSS)-interfering band; and generating a transmission indicating to prioritize obtaining GNSS measurement over uplink (UL) transmission on the GNSS-interfering band, in which a transmission power of one or more uplink transmissions is to be reduced when obtaining at least one GNSS measurement.

13. The method according to claim 12, further including identifying GNSS measurement occasion information received from the UE.

14. The method according to claim 13, further comprising:

determining a GNSS measurement occasion based on the GNSS measurement occasion information; and configuring the at least one GNSS measurement to cover the GNSS measurement occasion.

15. One or more non-transitory, computer-readable media having instructions that, when executed, cause processing circuitry to:

identify a configuration indicating that obtaining Global Navigation Satellite System (GNSS) measurement is prioritized over uplink (UL) transmission on a GNSS-interfering band, the configuration being from a non-terrestrial network (NTN) serving cell, the GNSS-interfering band being the n14 band;

obtain at least one GNSS measurement; and in accordance with the configuration, reduce a transmission power of an uplink transmission corresponding to a component carrier on the GNSS interfering band while obtaining the at least one GNSS measurement.

16. The one or more non-transitory, computer-readable media according to claim 15, wherein the instructions, when executed, further cause the processing circuitry to:

generate a measurement gap request for transmission to a base station, wherein the configuration is received based on the measurement gap request.

17. The one or more non-transitory, computer-readable media according to claim 15, wherein the instructions, when executed, further cause the processing circuitry to:

generate a message with an indication of a first timing information for obtaining GNSS information for transmission to a base station, wherein a gap pattern for the the at least one GNSS measurement is based on the indication of the first timing information.

18. The one or more non-transitory, computer-readable media of claim 15, wherein to obtain the at least one GNSS measurement includes to obtain the at least one GNSS measurement in accordance with a gap pattern.

19. The one or more non-transitory, computer-readable media of claim 15, wherein the instructions, when executed, further cause the processing circuitry to:

generate, for transmission, an indication of user equipment (UE) capability to support a connection to the NTN serving cell while transmitting on the GNSS-interfering band, wherein the configuration is received based on transmission of the indication.

20. The one or more non-transitory, computer-readable media of claim 15, wherein the instructions, when executed, further cause the processing circuitry to:

identify a schedule for uplink transmissions received from the NTN serving cell; and identify that the at least one GNSS measurement collides with the uplink transmission based on the schedule, wherein the transmission power of the uplink transmission is reduced based on the identification that the at least one GNSS measurement collides with the uplink transmission.

* * * * *